(12) United States Patent
Miller

(10) Patent No.: US 12,434,249 B2
(45) Date of Patent: Oct. 7, 2025

(54) SYSTEMS AND METHODS FOR EXTRACTING AND ISOLATING PURIFIED WHEAT EMBRYO PRODUCTS

(71) Applicant: Tritica Biosciences, LLC, Wamego, KS (US)

(72) Inventor: Chris Miller, Wamego, KS (US)

(73) Assignee: Tritica Biosciences, LLC, Wamego, KS (US)

( * ) Notice: Subject to any disclaimer, the term of this patent is extended or adjusted under 35 U.S.C. 154(b) by 273 days.

(21) Appl. No.: 18/120,169

(22) Filed: Mar. 10, 2023

(65) Prior Publication Data

US 2024/0058822 A1 Feb. 22, 2024

Related U.S. Application Data

(63) Continuation of application No. 17/679,500, filed on Feb. 24, 2022, now Pat. No. 11,839,881.

(60) Provisional application No. 63/153,739, filed on Feb. 25, 2021.

(51) Int. Cl.
| | |
|---|---|
| B02C 9/00 | (2006.01) |
| B02B 3/00 | (2006.01) |
| B02B 3/08 | (2006.01) |
| B02B 5/02 | (2006.01) |
| B02C 9/04 | (2006.01) |
| B02C 19/00 | (2006.01) |
| B02C 13/09 | (2006.01) |

(52) U.S. Cl.
CPC ............... B02C 9/00 (2013.01); B02B 3/00 (2013.01); B02B 3/08 (2013.01); B02B 5/02 (2013.01); B02C 9/04 (2013.01); B02C 19/0012 (2013.01); B02C 13/095 (2013.01)

(58) Field of Classification Search
None
See application file for complete search history.

(56) References Cited

U.S. PATENT DOCUMENTS

| | | | | |
|---|---|---|---|---|
| 2,392,365 | A * | 1/1946 | Carter | ........... B02C 9/04 |
| | | | | 99/518 |
| 2,428,670 | A | 10/1947 | Hulse | |
| 2,745,748 | A | 5/1956 | McCashen | |
| 4,365,546 | A | 12/1982 | Giguere | |
| 4,515,076 | A | 5/1985 | Reznik | |
| 4,805,527 | A | 2/1989 | Yoshihara | |
| 4,986,997 | A | 1/1991 | Posner et al. | |
| 6,168,931 | B1 | 1/2001 | Swartz et al. | |
| 6,337,191 | B1 | 1/2002 | Swartz et al. | |
| 9,528,137 | B2 | 12/2016 | Jewett et al. | |
| 10,088,493 | B2 | 10/2018 | Kim et al. | |
| 2002/0168706 | A1 | 11/2002 | Chatterjee et al. | |
| 2004/0227023 | A1 * | 11/2004 | Hisamitsu | ........... B02C 18/06 |
| | | | | 241/74 |
| 2005/0001082 | A1 * | 1/2005 | Strauss | ........... B02C 13/1807 |
| | | | | 241/275 |
| 2005/0042305 | A1 * | 2/2005 | Endo | ........... C12P 21/00 |
| | | | | 424/94.2 |
| 2007/0141661 | A1 | 6/2007 | Endo et al. | |
| 2008/0179435 | A1 * | 7/2008 | Martinell | ........... B02B 3/045 |
| | | | | 241/38 |
| 2011/0195450 | A1 | 8/2011 | Kudlicki et al. | |
| 2017/0349928 | A1 | 12/2017 | Jewett et al. | |
| 2019/0309311 | A1 | 10/2019 | Koglin et al. | |
| 2020/0332332 | A1 | 10/2020 | Akiyama | |

FOREIGN PATENT DOCUMENTS

| | | | | |
|---|---|---|---|---|
| DE | | 890440 C | 9/1953 | |
| GB | | 583188 | 12/1946 | |
| GB | | 583188 A | * 12/1946 | ........... B02B 3/00 |
| WO | WO 2003/038117 A2 | | 5/2003 | |

OTHER PUBLICATIONS

Caschera et al. (2015) "A cost-effective polyphosphate-based metabolism fuels an all *E. coli* cell-free expression system," Metabolic Engineering 27, 29-37.
Extended European Search Report corresponding to European Application No. 22760412.1, issued May 8, 2025.
International Search Report and Written Opinion corresponding to international application No. PCT/US22/17715, mailed May 23, 2022.
Lee et al. (2018) "Recent advances in development of cell-free protein synthesis systems for fast and efficient production of recombinant proteins," FEMS Microbiology Letters, vol. 365, No. 17, 7 pages.
Lim et al. (2019) "Cell-Free Metabolic Engineering: Recent Developments and Future Prospects," Methods Protoc. 2, 33; doi:10.3390/mps2020033, 11 pages.
Madin et al. (2000) "A highly efficient and robust cell-free protein synthesis system prepared from wheat embryos: Plants apparently contain a suicide system directed at ribosomes," PNAS, vol. 97, No. 2, 559-564.
Moon et al. (2019) "Effects of ATP regeneration systems on the yields and solubilities of cell-free synthesized proteins," Journal of Industrial and Engineering Chemistry 70, 276-280.
Posner et al. (1991) "A Technique for Separation of Wheat Germ by Impacting and Subsequent Grinding," Journal of Cereal Science 13, 49-70.
Promega Technical Manual (2019) "Wheat Germ Extract," 20 pages.
Takai et al. (2010) "Practical cell-free protein synthesis system using purified wheat embryos," Nature Protocols, vol. 5, No. 2, 227-238.

(Continued)

*Primary Examiner* — Jared O Brown
(74) *Attorney, Agent, or Firm* — Leydig, Voit & Mayer, Ltd.

(57) ABSTRACT

Methods for producing a purified wheat embryo product are disclosed. In one embodiment, producing a purified wheat embryo product includes the steps of: accelerating a plurality of wheat berries toward an impact surface, impacting each of the plurality of wheat berries against the impact surface, dislodging at least some of the wheat embryos from the wheat berries in response to the impacting step such that the dislodged embryos are intact, and separating the dislodged wheat embryos from the bran and the endosperm to produce an intermediate purified wheat embryo product.

24 Claims, 30 Drawing Sheets

(56) References Cited

OTHER PUBLICATIONS

Unifine Mills Flour Milling Brochure, 24 pages.
Wang et al. (2009) "Cell-free protein synthesis energized by slowly-metabolized maltodextrin," BMC Biotechnology 9:58, 8 pages.

* cited by examiner

--PRIOR ART--

| Sample # | Coderma Speed (Hz) | Coderma Speed RPM | Coderma Tip Speed (m/s) | Moisture (%) | #7 Overs (g) | #18 Overs (g) | #30 Overs (g) | Pan (g) | After Aspiration (g) | Bran (g) | | Recovered (g) | Germ Fraction (%) |
|---|---|---|---|---|---|---|---|---|---|---|---|---|---|
| 1 | 10.0 | 300 | 9.6 | 11.8 | 300.0 | 0.0 | 0.0 | 0.0 | 0.0 | 0.0 | No Breakage | 300.0 | 0.00% |
| 2 | 20.0 | 600 | 19.1 | 11.8 | 300.0 | 0.0 | 0.0 | 0.0 | 0.0 | 0.0 | No Breakage | 300.0 | 0.00% |
| 3 | 30.0 | 900 | 28.7 | 11.8 | 223.7 | 72.0 | 0.0 | 0.0 | 0.3 | 0.0 | | 295.7 | 0.00% |
| 4 | 40.0 | 1200 | 38.3 | 11.8 | 193.0 | 101.3 | 1.1 | 0.6 | 0.9 | 0.0 | Minimal Germ | 296.2 | 0.30% |
| 5 | 40.0 | 1200 | 38.3 | 12.2 | 197.8 | 95.3 | 0.7 | 0.3 | 0.7 | 0.0 | | 294.3 | 0.24% |
| 6 | 40.0 | 1200 | 38.3 | 13.5 | 222.6 | 71.2 | 0.0 | 0.0 | 0.0 | 0.0 | No Breakage | 293.8 | 0.00% |
| 7 | 40.0 | 1200 | 38.3 | 18.0 | 300.0 | 0.0 | 0.0 | 0.0 | 0.0 | 0.0 | | 300.0 | 0.00% |
| 8 | 50.0 | 1500 | 47.9 | 11.8 | 137.8 | 150.3 | 4.0 | 1.6 | 3.2 | 0.7 | | 293.6 | 1.09% |
| 9 | 50.0 | 1500 | 47.9 | 12.2 | 142.3 | 149.1 | 3.5 | 1.4 | 2.9 | 0.2 | | 296.3 | 0.98% |
| 10 | 50.0 | 1500 | 47.9 | 13.5 | 192.4 | 99.6 | 1.0 | 0.5 | 0.7 | 0.3 | | 293.5 | 0.24% |
| 11 | 50.0 | 1500 | 42.9 | 18.0 | 250.5 | 45.0 | 0.0 | 0.0 | 0.0 | 0.0 | | 295.5 | 0.00% |
| 12 | 60.0 | 1800 | 52.4 | 11.8 | 82.9 | 198.0 | 9.2 | 4.4 | 8.0 | 1.1 | Minimal Germ | 294.5 | 2.72% |
| 13 | 60.0 | 1800 | 52.4 | 12.2 | 88.3 | 197.1 | 7.7 | 4.0 | 6.9 | 0.8 | | 297.1 | 2.32% |
| 14 | 60.0 | 1800 | 57.4 | 13.5 | 139.4 | 151.0 | 3.3 | 1.6 | 2.8 | 0.4 | | 295.5 | 0.95% |
| 27 | 60.0 | 1800 | 57.4 | 14.0 | 380.1 | 585.8 | 14.9 | 9.3 | 13.8 | 1.1 | Not Scoured | 990.1 | 1.39% |
| 28 | 60.0 | 1800 | 57.4 | 14.0 | 359.2 | 607.0 | 17.7 | 10.8 | 16.7 | 1.0 | Scoured | 994.7 | 1.68% |
| 15 | 60.0 | 1800 | 52.4 | 18.0 | 227.2 | 66.8 | 0.4 | 0.4 | 0.3 | 0.1 | Minimal Germ | 294.8 | 0.10% |
| 16 | 75.0 | 2250 | 71.8 | 11.8 | 29.7 | 229.7 | 19.7 | 11.2 | 17.7 | 1.5 | 100% Broken | 290.3 | 6.10% |
| 17 | 75.0 | 2250 | 71.8 | 12.2 | 40.0 | 227.1 | 18.3 | 10.8 | 16.8 | 1.2 | | 296.2 | 5.67% |
| 18 | 75.0 | 2250 | 71.8 | 13.5 | 62.6 | 214.4 | 10.8 | 6.7 | 9.3 | 1.1 | | 294.5 | 3.16% |
| 19 | 75.0 | 2250 | 71.8 | 18.0 | 159.1 | 128.4 | 2.6 | 2.4 | 1.9 | 0.7 | | 292.5 | 0.65% |
| 20 | 90.0 | 2700 | 86.1 | 11.8 | 13.3 | 225.6 | 33.5 | 22.1 | 30.6 | 2.0 | Pulverized | 294.5 | 10.39% |
| 21 | 90.0 | 2700 | 86.1 | 12.2 | 11.5 | 231.2 | 30.7 | 21.1 | 29.1 | 1.1 | Pulverized | 294.5 | 9.89% |
| 22 | 90.0 | 2700 | 86.1 | 13.5 | 27.6 | 229.0 | 20.4 | 14.3 | 18.4 | 1.3 | Pulverized | 293.3 | 6.32% |
| 23 | 90.0 | 2700 | 86.1 | 18.0 | 98.6 | 186.1 | 8.5 | 7.1 | 7.4 | 0.7 | Pulverized | 293.3 | 2.55% |
| 24 | 100.0 | 3000 | 95.7 | 13.5 | 19.3 | 225.3 | 22.9 | 20.4 | 26.4 | 0.6 | Pulverized | 292.9 | 9.03% |
| 25 | 100.0 | 3000 | 95.7 | 18.0 | 60.1 | 206.8 | 13.0 | 10.9 | 11.5 | 0.7 | Pulverized | 290.8 | 3.95% |
| 26 | 110.0 | 3300 | 105.3 | 18.0 | 40.8 | 214.3 | 19.0 | 15.3 | 17.2 | 0.8 | Pulverized | 289.4 | 5.94% |

FIG. 13

| Sample # | Bran Yield | Endo Yield | Germ Yield | Bran Px | Endo Px | Germ px | Total Pixels | Bran % px | Endo % px | Germ % px |
|---|---|---|---|---|---|---|---|---|---|---|
| 1 | 0.0 | 0.0 | 0.0 | 0.0 | 0.0 | 0.0 | 0.0 | 0.0 | 0.0 | 0.0 |
| 2 | 0.0 | 0.0 | 0.0 | 0.0 | 0.0 | 0.0 | 0.0 | 0.0 | 0.0 | 0.0 |
| 3 | 0.008% | 0.009% | 0.037% | 127,762 | 132,872 | 575,327 | 835,961 | 15.28% | 15.89% | 68.822% |
| 4 | 0.066% | 0.021% | 0.217% | 311,375 | 97,418 | 1,024,509 | 1,433,302 | 21.72% | 6.80% | 71.479% |
| 5 | 0.077% | 0.015% | 0.145% | 533,861 | 106,929 | 1,007,692 | 1,648,482 | 32.39% | 6.49% | 61.128% |
| 6 | 0.000% | 0.000% | 0.000% | 137,145 | 73,531 | 995,936 | 1,206,612 | 11.37% | 6.09% | 82.540% |
| 7 | 0.0 | 0.0 | 0.0 | 0.0 | 0.0 | 0.0 | 0.0 | 0.0 | 0.0 | 0.0 |
| 8 | 0.350% | 0.118% | 0.622% | 556,170 | 188,027 | 987,637 | 1,731,834 | 32.11% | 10.86% | 57.028% |
| 9 | 0.352% | 0.117% | 0.510% | 610,299 | 202,013 | 883,144 | 1,695,456 | 36.00% | 11.91% | 52.089% |
| 10 | 0.044% | 0.030% | 0.164% | 389,599 | 261,708 | 1,440,258 | 2,091,565 | 18.63% | 12.51% | 68.860% |
| 11 | 0.0 | 0.0 | 0.000% | 0.0 | 0.0 | 0.0 | 0.0 | 0.0 | 0.0 | 0.0 |
| 12 | 0.0 | 0.0 | 0.0 | 0.0 | 0.0 | 0.0 | 0.0 | | | |
| 13 | 0.0 | 0.0 | 0.0 | 0.0 | 0.0 | 0.0 | 0.0 | | | |
| 14 | 0.256% | 0.167% | 0.524% | 507,998 | 331,608 | 1,039,651 | 1,879,257 | 27.03% | 17.65% | 55.322% |
| 27 | 0.244% | 0.31% | 0.85% | 287081 | 376276 | 1021416 | 1,684,773 | 17.04% | 22.33% | 60.63% |
| 28 | 0.18% | 0.36% | 1.16% | 193119 | 438893 | 1408496 | 2,041,508 | 9.46% | 21.50% | 69.04% |
| 15 | 0.0 | 0.0 | 0.0 | 0.0 | 0.0 | 0.0 | 0.0 | 0.0 | 0.0 | 0.0 |
| 16 | 0.0 | 0.0 | 0.0 | 0.0 | 0.0 | 0.0 | 0.0 | 0.0 | 0.0 | 0.0 |
| 17 | 0.0 | 0.0 | 0.0 | 0.0 | 0.0 | 0.0 | 0.0 | 0.0 | 0.0 | 0.0 |
| 18 | 1.040% | 0.961% | 1.156% | 649,366 | 600,141 | 721,901 | 1,971,408 | 32.94% | 30.44% | 36.619% |
| 19 | 0.0 | 0.0 | 0.0 | 0.0 | 0.0 | 0.0 | 0.0 | 0.0 | 0.0 | 0.0 |

FIG. 14

--PRIOR ART--

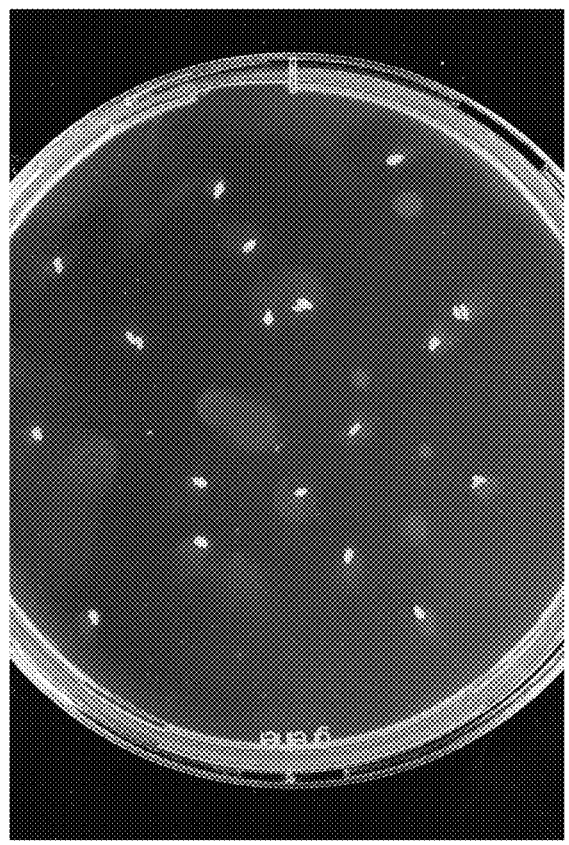
--PRIOR ART--
FIG. 29        FIG. 30

--PRIOR ART--

SYSTEMS AND METHODS FOR EXTRACTING AND ISOLATING PURIFIED WHEAT EMBRYO PRODUCTS

CROSS-REFERENCE TO RELATED APPLICATIONS

This patent application is a continuation application of U.S. patent application Ser. No. 17/679,500, filed Feb. 24, 2022, which application claims the benefit of and priority to U.S. Patent Application No. 63/153,739 filed Feb. 25, 2021, both of which are hereby incorporated by reference in their entirely to the extent not inconsistent herewith.

BACKGROUND OF INVENTION

Cell-free protein synthesis, also known as in vitro protein synthesis or CFPS, is the production of protein using biological machinery in a cell-free system, that is, without the use of living cells. The in vitro protein synthesis environment is not constrained by a cell wall or homeostasis conditions necessary to maintain cell viability. Thus, CFPS enables direct access and control of the translation environment which is advantageous for numerous applications including co-translational solubilization of membrane proteins, optimization of protein production, incorporation of non-natural amino acids, selective and site-specific labelling. Due to the open nature of the system, different expression conditions such as pH, redox potentials, temperatures, and chaperones can be screened.

Commercial cell-free systems are now available from a variety of material sources, ranging from "traditional" *E. coli*, rabbit reticulocyte lysate, and wheat germ extract systems, to recent insect and human cell extracts, to defined systems reconstituted from purified recombinant components. Though each cell-free system has certain advantages and disadvantages, the diversity of the cell-free systems allows in vitro synthesis of a wide range of proteins for a variety of downstream applications. In the post-genomic era, cell-free protein synthesis has rapidly become the preferred approach for high throughput functional and structural studies of proteins and a versatile tool for in vitro protein evolution and synthetic biology.

The currently available yields from eukaryotic extracts, including rabbit reticulocyte lysate and wheat germ extracts, limit use of cell-free protein synthesis to that of an analytical tool, rather than the basis for a protein factory. The low cost and ready availability of wheat makes wheat embryo-based synthesis an attractive choice as the basis for industrial scale cell-free protein synthesis. However, the availability of viable wheat germ extract is extremely limited because embryonic ribosomes are susceptible to tritin, a protein found in wheat endosperm that efficiently inhibits protein synthesis, even at trace levels. Conventional methods of producing wheat germ result in significant contamination of the final wheat germ product with endosperm particles. As noted, the contamination of wheat germ with tritin-containing endosperm fragments significantly hinders the usefulness of wheat germ as a vehicle of cell-free protein synthesis. Furthermore, the methods of the prior art result in crushed-flat wheat embryos. Wheat embryos inside harvested wheat berries are naturally in a state of dormancy—they are not active, but they are very much still alive. The process of crushing the wheat berries kills the embryos and chemical decomposition processes begin almost immediately. Thus, protein synthesis compounds derived from wheat germ, besides having high concentrations of tritin, also suffer from the inclusion of decomposition products which are also deleterious to protein synthesis.

In addition to conventional wheat germ production processes described above, Elieser S. Posner of Kansas State University developed a method of separating wheat embryos from wheat berries by repeatedly beating the wheat berries at random impact directions with the rotating impactors of a conventional wheat scouring device. Posner describes "wheat kernels entering the scourer are beaten by rotating impactors and thrown against the metal drum bottom, which is perforated with 2 mm diameter holes. The machine is driven by a variable speed motor. Different scouring lengths were realized by recycling samples through the scourer." ("A Technique for Separation of Wheat Germ by Impacting and Subsequent Grinding", Journal of Cereal Science 13 (1991) 49-70, E. S. POSNER and Y. Z. LI).

Posner developed an optimized impact speed for the multiple, random, impacts "This machine was driven by a variable speed motor, and was equipped with a screen having openings of two millimeters in diameter. With this unit, a tip speed of 21.2 meters per second was found to be optimum, although speeds from 18-25 meters per second could be employed." (U.S. Pat. No. 4,986,997)

However, as further detailed below, Posner's method of repeatedly beating the wheat berries with spinning impellers produces separated wheat embryos having fissures, chips and breaks that are lethal to the embryos. Accordingly, Posner's process initiates the decomposition process within the embryos. Furthermore, Posner's process generally results in insufficiently pure wheat embryo intermediate products for the purposes of cell-free protein synthesis.

Therefore, due to flaws inherent in the prior art processing techniques, the enormous potential of wheat as the basis for large scale cell-free protein synthesis has remained unrealized for decades. The industrial-scale manufacture of highly specific and pure proteins using components found in wheat would be breakthrough technology.

Accordingly, new methods of wheat embryo isolation and purification are needed. Such new methods should be suitable for large scale production yet capable of achieving extremely low levels of tritin and decomposition products.

SUMMARY OF THE INVENTION

Provided herein are systems and methods for extracting and isolating purified wheat embryo products. The disclosed systems and methods overcome the primary obstacles for a wheat embryo-based process, unlocking the potential to move cell-free protein synthesis from the bench-top to an industrial scale. The disclosed systems and methods may yield industrial amounts of wheat embryo having extremely low levels of tritin contamination.

In one embodiment, a method for producing an intermediate purified wheat embryo product comprising the steps of accelerating a plurality of wheat berries toward an impact surface, impacting each of the plurality of wheat berries against the impact surface, dislodging at least some of the wheat embryos from the wheat berries in response to the impacting step such that the dislodged embryos are intact, and separating the dislodged wheat embryos from the bran and the endosperm to produce an intermediate purified wheat embryo product. Each of the wheat berries may comprise a wheat embryo, bran, and endosperm.

The wheat berries may be described as having a long axis extending between a first end and a second end, the wheat embryo being disposed at the first end. The method may comprise prior to the impacting step, orienting the wheat berries to an impact orientation such that each wheat berry impacts the impact surface at the first end or the second end.

The method may comprise impacting each wheat berry against the impact surface with an impact direction, the impact direction being aligned with the long axis of the wheat berry.

In some embodiments, the accelerating step is performed via an impeller. In some embodiments the impeller comprises a plurality of radially disposed vanes. In some embodiments, the orienting step may comprise accelerating the wheat berries along grooves formed in the vanes.

In alternative embodiments, the accelerating step may be performed via a tube and a compressed gas source. The diameter of the tube may correspond to a cross section of a wheat berry perpendicular to its long axis. The compressed gas source may be utilized to eject the wheat berry from the tube, analogous to an air rifle.

In some embodiments, the impacting comprises impacting each of the plurality of wheat berries a single time against the impact surface.

In some embodiments, the impacting comprises impacting the wheat berries against the impact surface with an impact speed selected from 29 to 86 m/s. In some embodiments, the impacting comprises impacting the wheat berries against the impact surface with an impact speed selected from 38 to 86 m/s. In some embodiments, the impacting comprises impacting the wheat berries against the impact surface with an impact speed selected from 48 to 72 m/s.

In some embodiments, the method includes adjusting the moisture content of the wheat berries to a predetermined moisture level prior to the impacting step. In one embodiment, the predetermined moisture level is 11 to 18 wt %. In one embodiment, the predetermined moisture level is 13 to 15 wt %. In one embodiment, the predetermined moisture level is 13.5 to 14 wt %.

In some embodiments, the impact surface is a stationary surface during the impacting step. In some embodiments, the impact surface is free of corners, blades, and/or sharp members.

In some embodiments, in response to the accelerating step and before the impacting step, each wheat berry becomes a projectile.

In some embodiments, the intermediate purified wheat embryo product comprises at least 91 wt. % intact wheat embryos. In some embodiments, the intermediate purified wheat embryo product is essentially free of tritin. In some embodiments, the intact dislodged embryos are viable. In some embodiments, the intermediate purified wheat embryo product is essentially free of decomposition products.

In one embodiment, the impacting step comprises accelerating the wheat berries via a centrifugal acceleration of 500×g to 2500×g. In one embodiment, the impacting step comprises accelerating the wheat berries via a centrifugal acceleration of 1000×g to 1650×g.

In one embodiment, the separating step comprises screening the dislodged wheat embryos from the bran and the endosperm. In one embodiment, the screening step comprises optically color sorting the wheat embryos from the bran and the endosperm. In one embodiment, the separating step comprises floatation of the wheat embryos in an aqueous liquid. In one embodiment, the intermediate purified wheat embryo product comprises at least 99.9 wt. % intact wheat embryos.

In one embodiment, a method for producing an intermediate filtered wheat embryo product comprising the steps of: obtaining a plurality of wheat berries, the wheat berries comprising wheat embryos, bran, and endosperm; accelerating each of the plurality of wheat berries toward an impact surface; impacting each of the plurality of wheat berries against the impact surface; in response to the impacting step, dislodging at least some of the wheat embryos from the wheat berries such that the dislodged embryos are intact; separating the dislodged wheat embryos from the bran and the endosperm; pulverizing the dislodged wheat embryos to produce pulverized wheat embryos; and filtering the pulverized wheat embryos to produce an intermediate filtered wheat embryo product.

In one embodiment, the method comprises, prior to the impacting step, orienting the wheat berries such that each wheat berry impacts the impact surface at the first end or the second end. In one embodiment, each wheat berry impacts the impact surface with an impact direction, the impact direction being aligned with the long axis of the wheat berry.

In one embodiment, the impacting comprises impacting each of the plurality of wheat berries a single time against the impact surface. In one embodiment, the impacting comprises impacting the wheat berries against the impact surface with an impact speed selected from 29 to 86 m/s. In one embodiment, the impacting comprises impacting the wheat berries against the impact surface with an impact speed selected from 38 to 86 m/s. In one embodiment, the impacting comprises impacting the wheat berries against the impact surface with an impact speed selected from 48 to 72 m/s.

In one embodiment, the impact surface is a stationary surface during the impacting step. In one embodiment, in response to the accelerating step and before the impacting step, each wheat berry becomes a projectile.

In one embodiment, the intermediate filtered wheat embryo product is essentially free of decomposition products. In one embodiment, the intermediate filtered wheat embryo product is essentially free of tritin.

In one embodiment, the separating step comprises screening the dislodged wheat embryos from the bran and the endosperm. In one embodiment, the screening step comprises screening for particles between 1300 and 600 microns in order to isolate the wheat embryos from the bran and the endosperm. In one embodiment, the screening step comprises screening for particles between 1180 and 680 microns in order to isolate the wheat embryos from the bran and the endosperm.

In one embodiment, the separating step comprises floatation of the wheat embryos in an aqueous liquid.

In one embodiment, the pulverizing step comprises, prior to the blending step, freezing the wheat embryos.

In one embodiment, the freezing step comprises contacting the wheat embryos with liquid nitrogen.

In one embodiment, the pulverizing step comprises blending the wheat embryos with an extraction liquid to produce a slurry.

In one embodiment, the purification step comprises decanting the slurry.

In one embodiment, the decanting step comprises centrifuging the slurry and decanting a supernatant liquid.

In one embodiment, the filtering step comprises passing the supernatant liquid through a column filter. In one embodiment, the column filter is a gel column filter.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 13-17 Show the results of a moisture vs. impact velocity study. FIGS. 13 and 14 show the data comprehensively. In FIG. 15, the amount of material recovered in the fraction of interest is reported as a percentage of the total material milled. FIG. 16 is a chart showing the impact on composition for increasing impact velocity at constant moisture levels. FIG. 17 is a chart showing the total yield of embryo vs impact speed.

FIG. 29 shows a test of embryo viability for a randomly selected group of embryos collected via the dry process of the instant disclosure.

FIG. 30 shows the results of the identical experiment for a group of embryos collected via the Posner process.

STATEMENTS REGARDING CHEMICAL COMPOUNDS AND NOMENCLATURE

Figure 1:
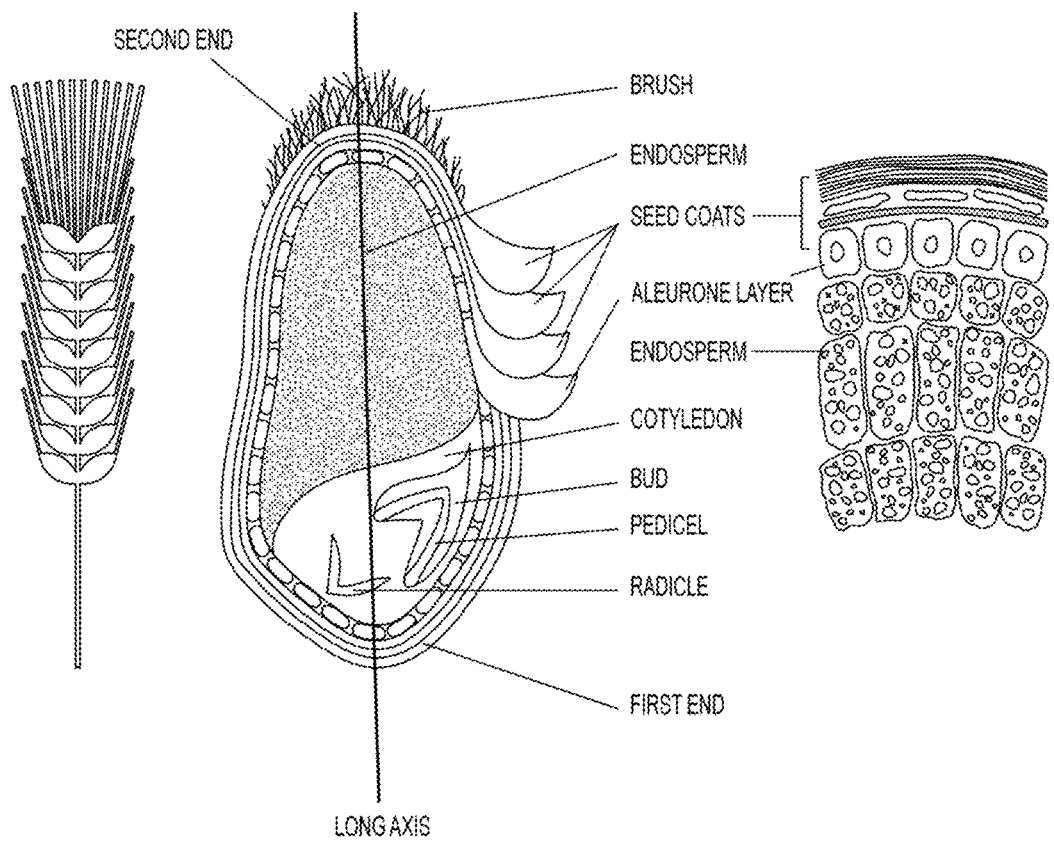
FIG. 1 is a diagram showing the structure of a wheat berry.

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Definitions

As used herein, the term "wheat germ" is sometimes used interchangeably with wheat embryo, or alternatively used to refer to a mixture of crushed wheat embryo, bran and endosperm particles.

As used herein, the term "viable wheat embryo" refers to an intact, living wheat embryo capable of sprouting into a wheat sprout under the appropriate conditions.

As used herein, the term "essentially free of tritin" means having a sufficiently low concentration of tritin such that protein synthesis is not measurably hindered.

As used herein, the term "projectile" is an object propelled by the exertion of a force which is allowed to move free under the influence of gravity and air resistance.

As used herein, the term "impact orientation" refers to the orientation of the wheat berry relative to an impact sustained by the wheat berry. Particularly useful impact orientations include orienting the long axis of the wheat berry such that impact occurs at the rounded "nose" or "tail" of the wheat berry, also referred to herein as the first end and second end.

As used herein, the term "impact direction" refers to the direction a wheat berry is traveling upon the initiation of the impact against the impact surface. Particularly useful impact directions include orienting the long axis of the wheat berry such that impact occurs with the wheat berry traveling in a direction aligned with the long axis. For example, the impact direction may be within 10 degrees or less of parallel to the long axis.

As used herein, the term "impact speed" or "impact velocity" refers to the speed at which a wheat berry is traveling at the moment just before impact with the impact surface.

As used herein, the term "single-impact milling" refers to impact milling of wheat berries wherein the wheat berries are accelerated and impacted against the impact surface a single time.

Turning now to FIG. 1, an example of a wheat berry is shown. As can be seen the wheat berry includes an outer casing, or bran, comprised of seed coats and an aleurone layer. The bran surrounds and protects both the embryo and the starchy endosperm. The embryo includes the cotyledon, the bud, the pedicel and the radicle. The embryo is the portion of the wheat berry that includes the protein synthesis machinery of interest, including ribosomes. The endosperm includes starches to provide energy to the embryo as it grows and establishes itself in the soil, until it can sprout above the surface and begin photosynthesis. As a protective measure to prevent parasitic organisms from consuming the endosperm, the endosperm also contains tritin, a protein that inhibits protein synthesis. Even trace amounts of tritin may inhibit protein synthesis in a cell-free protein synthesis context. Thus, unlocking the cell-free protein synthesis potential of the wheat embryo depends on essentially complete separation of the endosperm from the embryo.

Furthermore, as shown in FIG. 1, the wheat berry may be described as having a long axis extending between a first end and a second end, the wheat embryo being disposed at the first end.

Figure 2:
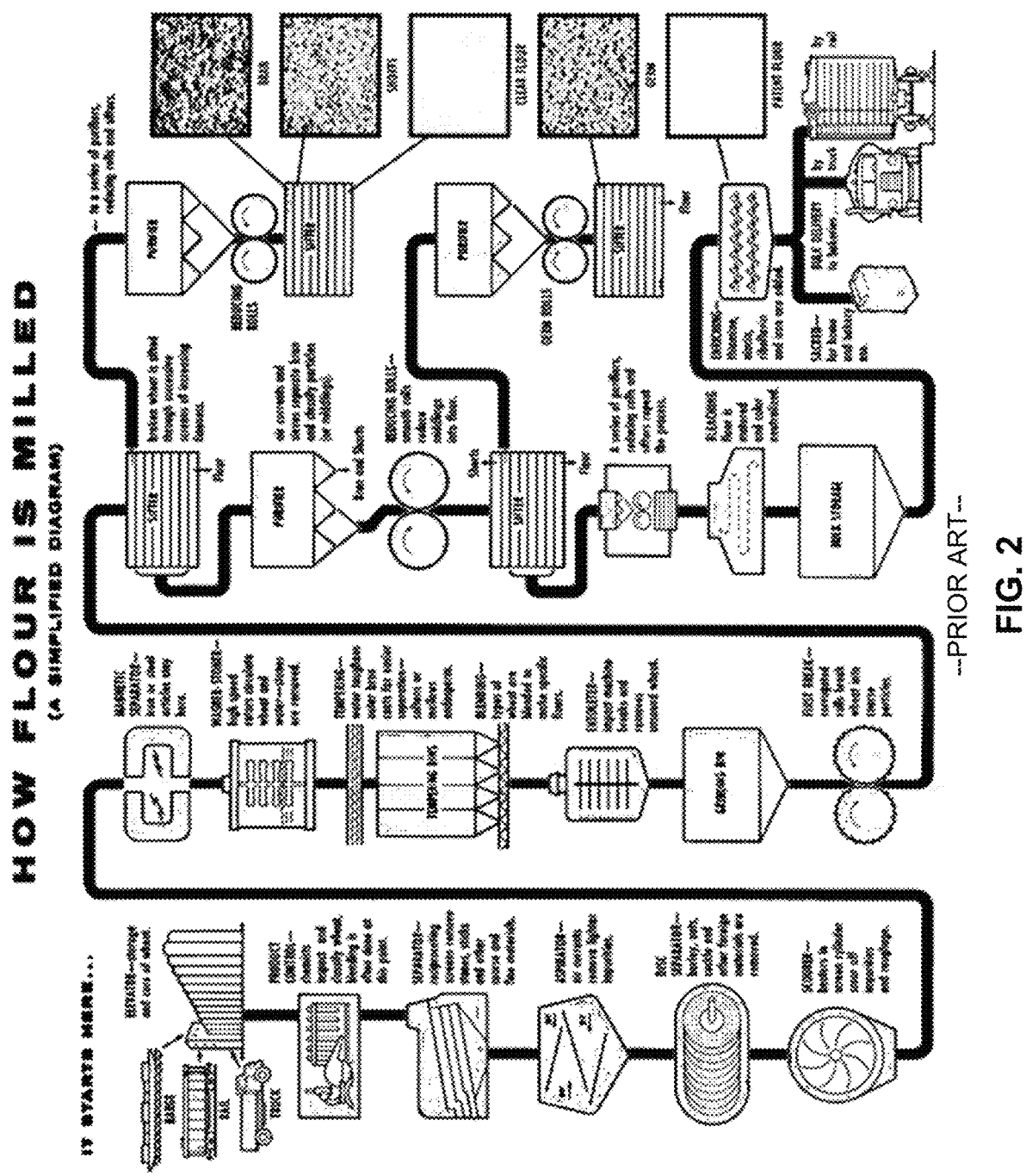
FIG. 2 is a first schematic diagram showing the wheat flour milling process of the prior art.
Figure 3:
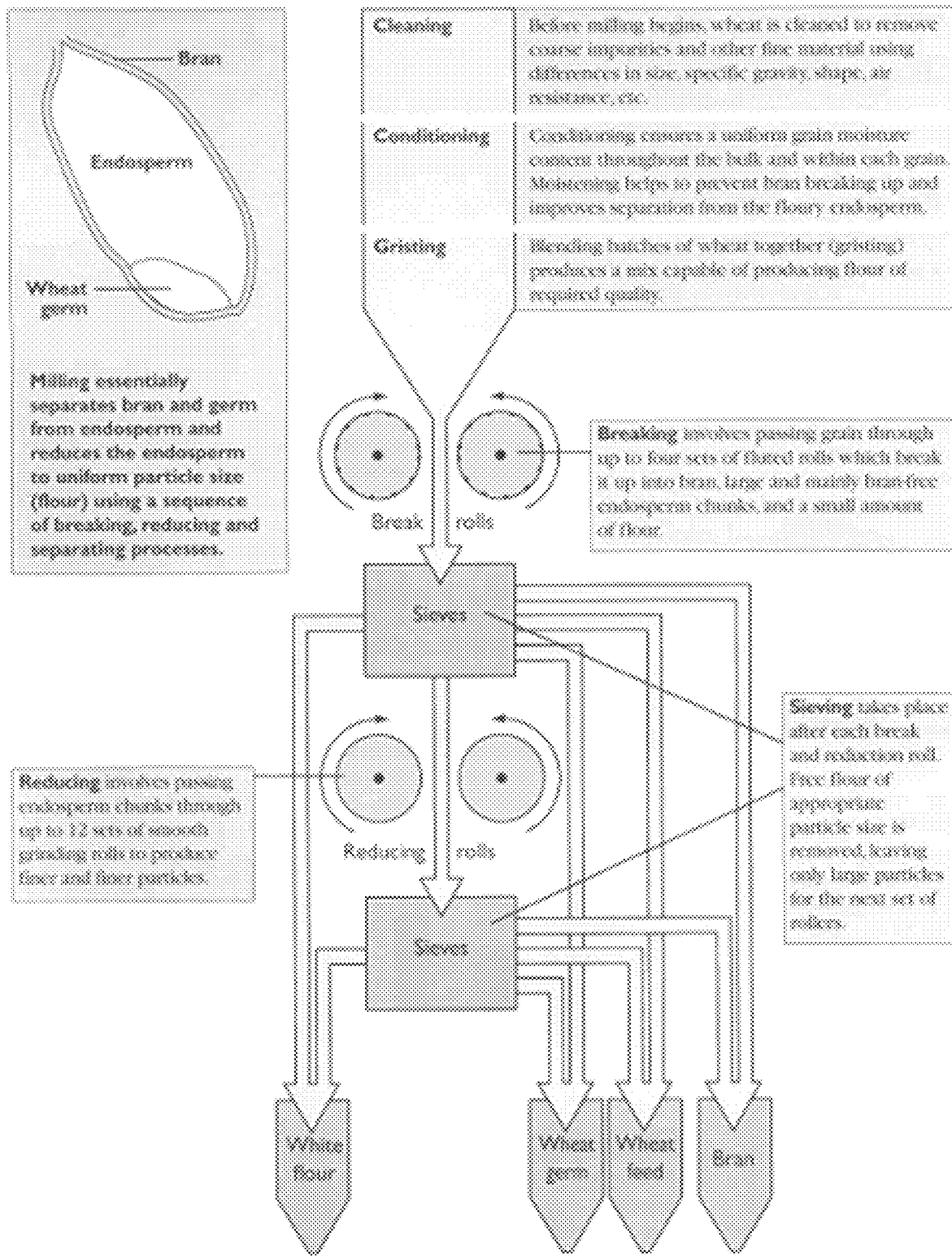
FIG. 3 is a second schematic diagram showing the wheat flour milling process of the prior art.

Turning now to FIGS. 2 and 3, prior art wheat processing methods are illustrated. As can be seen, in conventional wheat processing, one or more roller mills are used to crush and flatten the entire wheat berries and then separate the resulting flattened particles by size, via a series of sieves, into at least a flour fraction, a bran fraction, and a wheat germ fraction.

Figure 4:
FIG. 4 is a photograph of wheat germ produced via the method of the prior art. As can be seen, the wheat germ is composed of crushed wheat embryos, crushed wheat bran and crushed endosperm. The crushed bran particles are embedded with the crushed embryos.

FIG. 4 shows a close up photograph of representative commercial wheat germ produced by the method of FIGS. 2 and 3. As can be seen, the wheat germ includes crushed embryos (pale yellow) along with significant amounts of bran (light brown) and endosperm (white). In particular, it can be seen that small particles of endosperm are inextricably smashed into the embryos, such that no amount of post processing is likely to remove all the endosperm. Thus, due to the unavoidable presence of tritin-containing endosperm particles, wheat germ of the prior art is inherently ill-suited for use as a supply of cell-free protein synthesis platform.

Furthermore, as shown in FIG. 4, the embryos are crushed by the roller mill processing, thus rendering them inviable and initiating the chemical decomposition process of the ribosomes and other protein synthesis machinery and components.

It has been discovered, however, that under the right conditions, wheat embryos may be cleanly cleaved from the bran and endosperm via high speed impact. Surprisingly, the impact processing of the present disclosure may leave the vast majority of the embryos intact and viable, while also facilitating the complete or near-complete removal of endosperm from the embryos.

Figure 5:
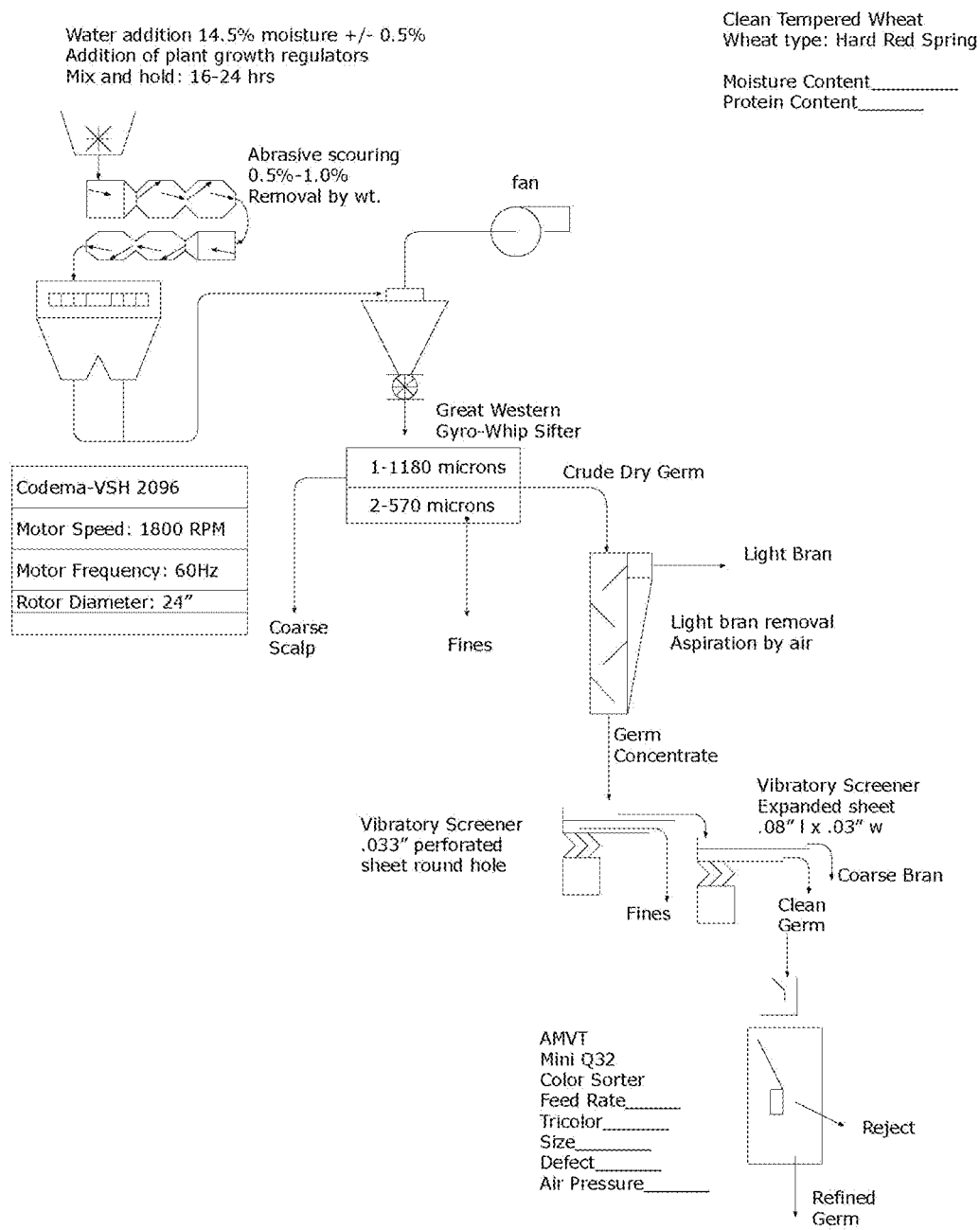
FIG. 5 is a schematic diagram of a method of producing a purified wheat embryo product in accordance with the present disclosure.

Turning now to FIG. 5, a schematic diagram of one embodiment of a method of producing a highly improved purified wheat embryo product is shown. In the illustrated method, wheat berries are moisture adjusted, then abrasively scoured before being fed into a centrifugal impactor. In the impactor, the wheat berries strike an impact surface, thereby dislodging the wheat embryos from the endosperm and bran. As mentioned above, the impact processing of the present disclosure may leave the vast majority of the embryos intact and viable. The wheat embryos may then be separated, via one or more separation steps, from the bran and the endosperm to produce an intermediate purified wheat embryo product.

In the illustrated embodiment, the separation process includes the steps of sifting, aspiration, screening and color sorting. In the sifting step, the fractured wheat berry stream produced in the impactor may be sorted by size via, for example, a gryo-whip sifter to remove a course fraction above and fines fraction below, leaving a crude dry embryo product. In the aspiration step, the middle fraction (crude dry embryo product) from the sifting step comprising at least some of the intact embryos may then be processed via air aspiration to remove bran particles from the heavier embryos, thereby producing an embryo concentrate. In the screening step, the embryo concentrate may be screened via one or more vibrator screeners. For example, the embryo concentrate may be screened via a first vibratory screener having a round perforations approximately 0.033 inch in diameter to remove fines. The embryos left on the top of the first vibratory screener may then be fed to a second vibratory screener having rectangular holes approximately 0.08×0.03 inches to allow the embryos to pass through the screen, leaving course bran on top of the screen.

To further improve the purity of the embryo product, the fraction that passed through the second screener may be fed into a color sorting machine, where bran and endosperm particles may be removed, leaving a highly refined embryo product.

In some embodiments, the embryo product produced via the methods disclosed herein may be essentially free of tritin. Thus, industrially useful quantities of pure or nearly pure wheat embryos may be produced. The embryo product may be further processed and/or stored in cold or cryogenic conditions, vastly enhancing the shelf life of the product.

Figure 6:
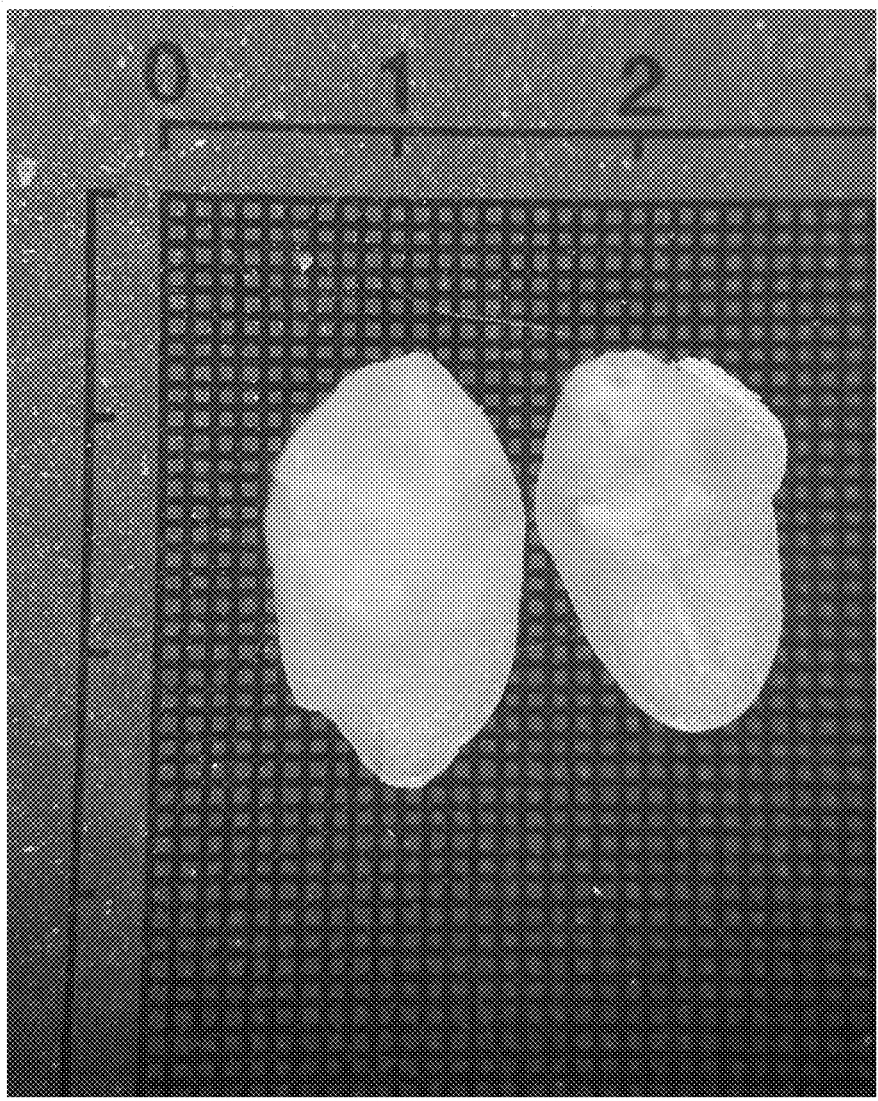
FIG. 6 is a photograph of intact, viable wheat embryos isolated via methods of the present disclosure. The wheat embryos have been placed on a 0.1 mm×0.1 mm grid to show size.

Furthermore, as can be seen, the process may be free of roller milling or any other similar crushing operations. Thus, the resulting refined embryo products produced via the disclosed methods may be comprised entirely or almost entirely of intact, viable wheat embryos, with little to no endosperm as shown in FIG. 6.

Figure 7:
FIG. 7 is a photograph of side by side comparison of intact, viable wheat embryos isolated via methods of the present disclosure (left), and wheat germ produced via the method of the prior art (right).

A side by side comparison of a refined embryo product of the present disclosure vs. wheat germ of the prior art is shown in FIG. 7. As can be seen, the prior art wheat germ includes significant bran and endosperm, while the refined embryo product does not.

Figure 8:
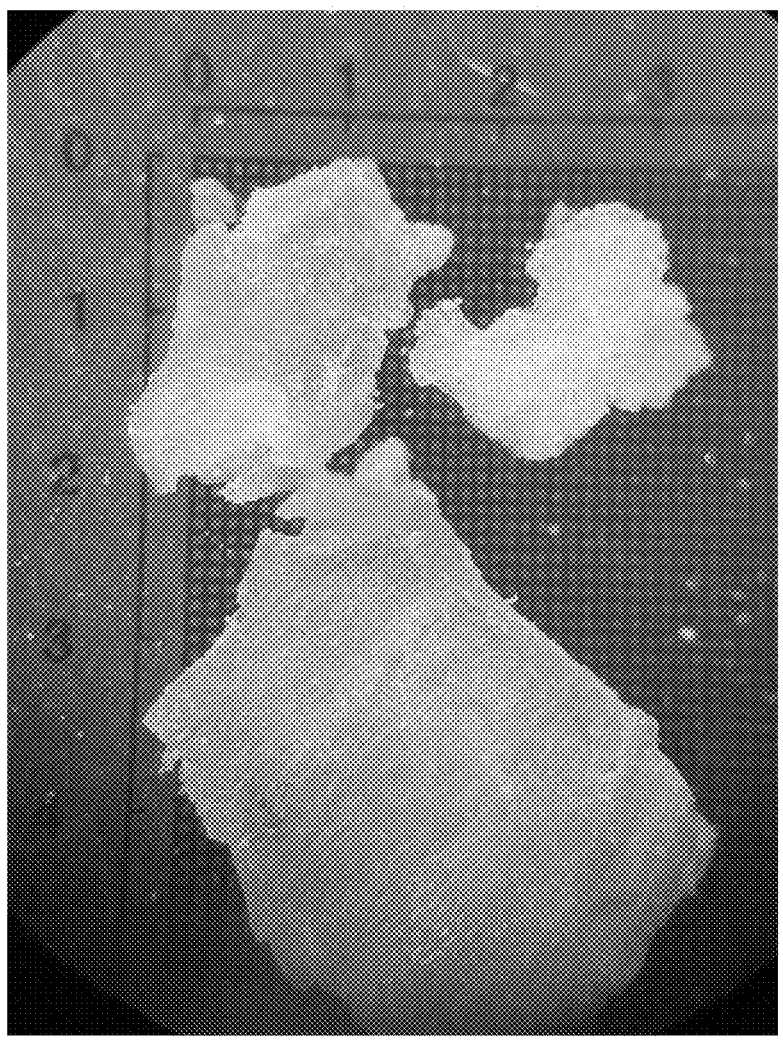
FIG. 8 is a photograph of the components of conventional wheat germ: crushed, flattened embryo (top left), flattened endosperm (top right) and flattened bran (bottom left).
Figure 9:
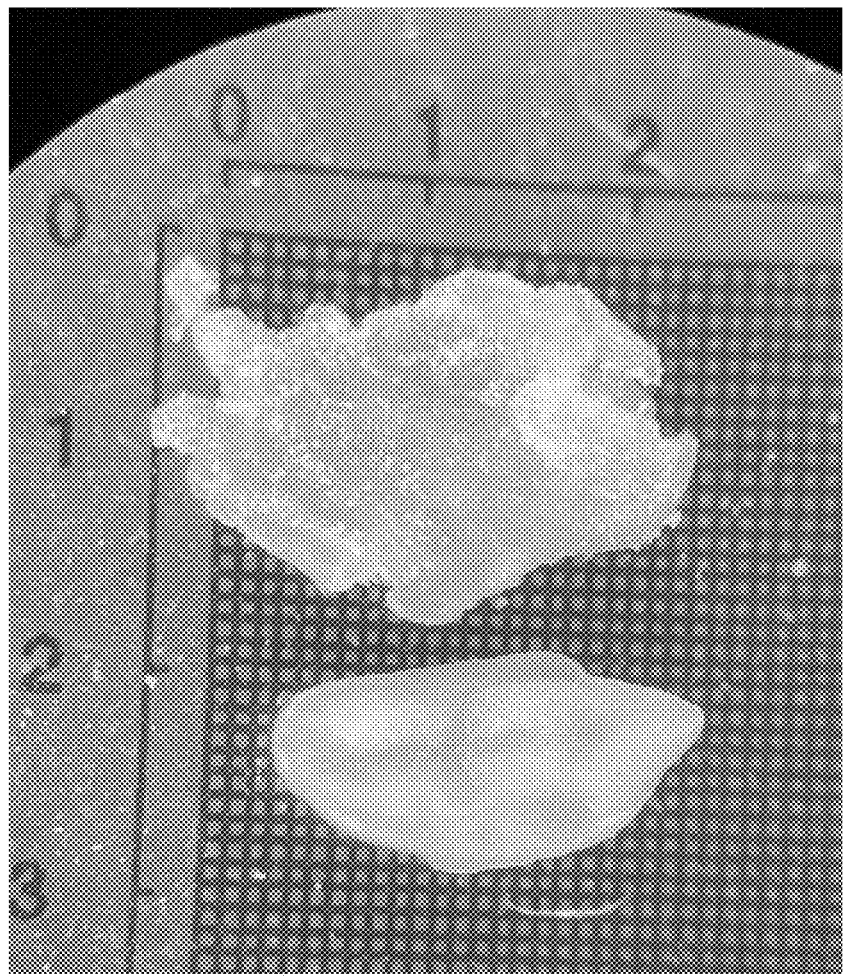
FIG. 9 is photograph of a crushed, flattened wheat embryo produced via the method of the prior art (top), and an intact, viable germ (bottom), shown on a 0.1 mm×0.1 mm grid.
Figure 10:
FIG. 10 is a photograph of intact, viable wheat embryos extracted and isolated via methods of the present disclosure (left) and commercial wheat germ of prior art (right), shown on a 0.1 mm×0.1 mm grid.

FIG. 8 shows flattened roller milled embryo (top left), endosperm (top right) and bran (bottom). As can be seen, the roller milling process destroys the embryo FIGS. 9 and 10 show side by side comparisons of a intact, viable embryos isolated via the methods of the present disclosure vs. wheat embryos produced via the method of the prior art.

Figure 11:
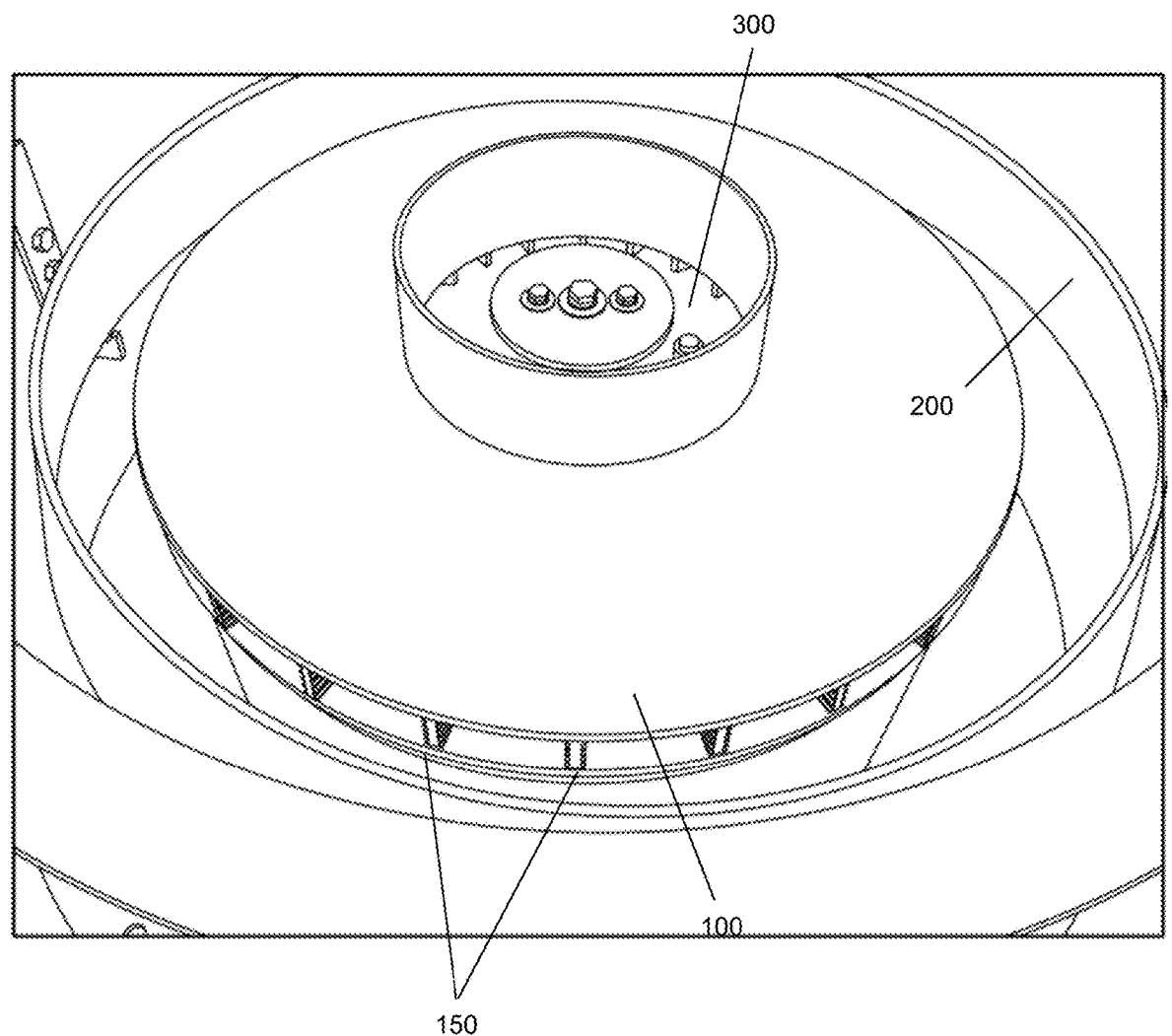
FIGS. 11 and 12 are photographs of an apparatus for impact milling in accordance with the present disclosure.
Figure 12:
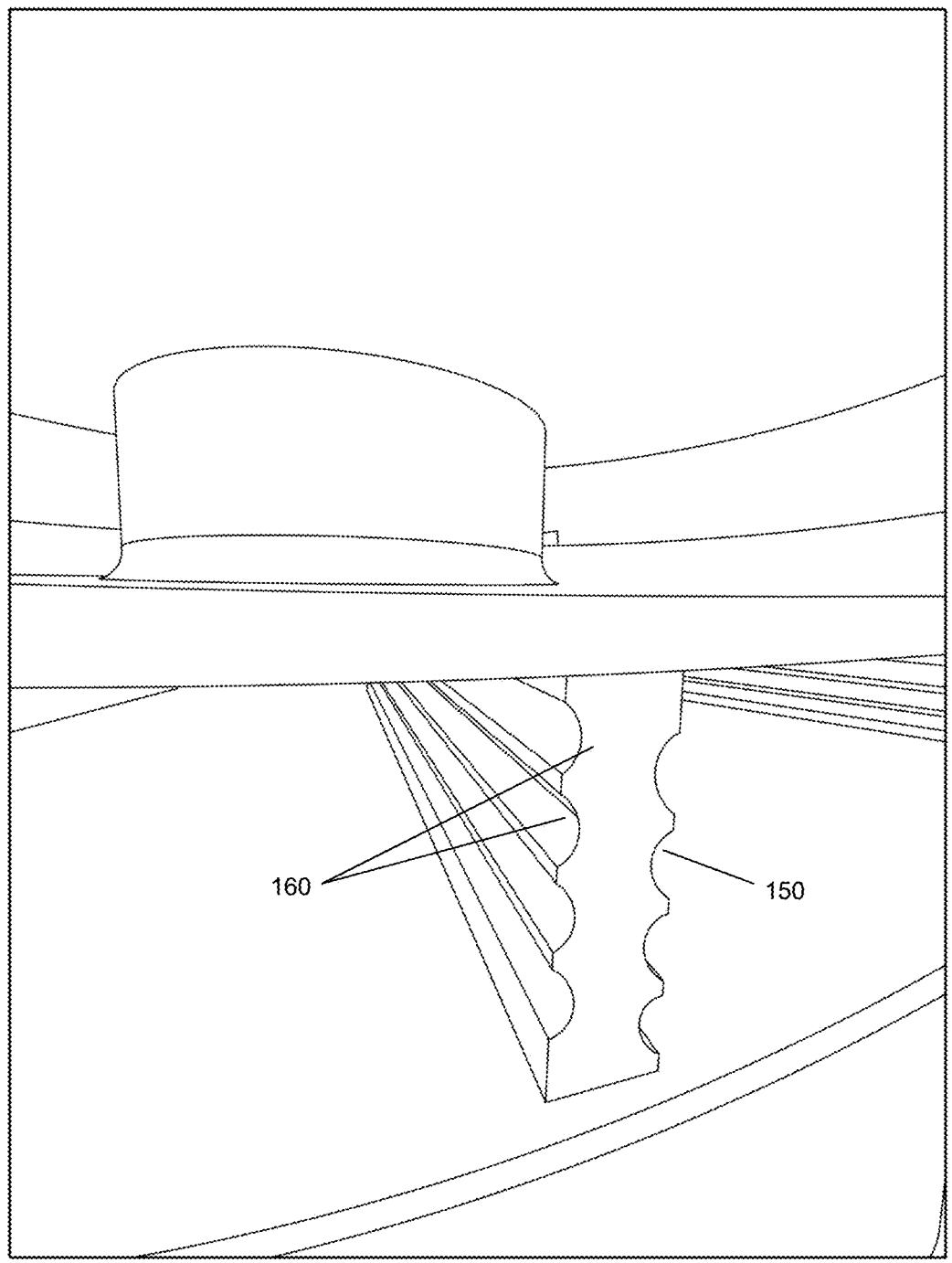

Turning to FIGS. 11-12, one embodiment of an apparatus useful for single-impact wheat embryo cleavage is illustrated. As can be seen, the apparatus includes an impeller 100 having radial vanes 150. The radial vanes 150 have grooves formed therein. The apparatus also includes an impact surface 200 spaced apart from the radial end of the impeller 100. Wheat berries may be fed into the inlet 300 while the impeller is spinning. The wheat berries are then accelerated along the grooves 160 of the vanes 150 until they fly out the end of the impeller 100, across the gap between the impeller 100 and the impact surface 200, and finally striking the impact surface 200. The cleaved embryos, along with the bran and endosperm are collected in the bottom of the apparatus for further separation and processing.

It has been discovered that the impact orientation is an important factor in achieving embryo cleavage while still preserving embryo viability. Accordingly, the size and shape of the grooves 160 may correspond to a cross section of a wheat berry perpendicular to its long axis. For example, the radius of the groove 160 may be selected to be smaller than the length of a wheat berry but larger than the width of the wheat berry. Thus, the wheat berries may auto-arrange in the grooves 160 to have an orientation with the long axis aligned with the direction of travel of the wheat berry. In this way, when the wheat berry becomes a projectile traveling toward the impact surface, it may travel in a stable orientation without tumbling, analogous to a football having been thrown in a spiral. Accordingly, the impact direction and impact orientation may be controlled, leading to reliable and repeatable embryo cleavage without lethal damage to the embryo.

Furthermore, as can be seen, the impact surface 200 is free of corners, blades, and/or sharp members. It has been found that a flat impact surface, free of sharp forms, can allow effective embryo cleavage without causing fissures, chips or other damage to the embryos. Thus, the viability of the embryos may be preserved through the cleavage process. The impact surface may be comprised of ceramic, steel, or any other suitably hard material.

In some embodiments, the method may further include seed dormancy pre-treatment prior to the impacting step. The pretreatment may bring the wheat seed out of dormancy with the use of natural plant hormones and cofactors including Gibberellin (GA3), Indole Acetic Acid and other Auxins. The pretreatment solution may further include cellulose degrading enzymes and other compounds such as antibiotic peptides. This pre-treatment composition may act as a tempering aid to facilitate the extraction of viable wheat embryos Example 1—Moisture and Impact Speed Interdependence It has been found that the appropriate moisture levels and the appropriate impact velocity are interdependent. Specifically, it has been found that less moisture tends to make the wheat berries more brittle while more moisture tends to make the wheat berries more elastic. Thus, too little moisture can cause the embryos to fracture or become damaged, even at the impact velocities required to cleave the embryos from the wheat berry. Whereas too much moisture can prevent the cleavage of the embryo from the wheat berry at any velocity up to a pulverization velocity, at which point all the structures of the wheat berry are smashed into a pulp. Thus, a predetermined moisture range, as well as a predetermined impact velocity range, may be necessary in order to achieve useful results.

In some embodiments, the moisture may be adjusted to within a target range, however, there may be some differential between the moisture level achieved and the target moisture level. Accordingly, rather than performing a potentially time consuming second moisture level adjustment, the impact velocity may be adjusted. A somewhat higher moisture level may require a somewhat higher impact velocity in order to balance the embryo cleavage rate with the embryo damage rate, and vice versa.

Turning now to FIGS. 13-18, results of a moisture and impact speed interdependence study are illustrated. Moisture levels ranging from 11.8% to 18% and impact speeds ranging from 9.6 to 105.3 m/s were studied. For the purposes of the study, the impact speed is assumed to be equal to the tip speed of the impeller. I.e., the deceleration of the wheat berry projectiles due to aerodynamic drag as the wheat berries travel across the gap between the tip of the impeller and the impact surface has been ignored, due to its assumed small magnitude given the short distance of travel.

The reported germ yield is based on the % of recovered material versus the percent of material milled. This is done to normalize the data for moisture loss due to the use of air and agitation, which causes drying of the materials. The physical loss of material due to sifting, dusting, spillage was held essentially constant between all samples.

After impact milling, the materials are sifted to separate products by particle size. The fraction of interest that contains germ is a small portion of the total product milled. This fraction is composed of three main components. Bran, Endosperm and Germ. Increasing the impact velocity has two measurable affects: 1) the ratio of bran and endosperm increases relative to the amount of germ in the fraction of interest; and 2) the fraction of interest increases with increased impact velocity. At an exceedingly high velocity the fraction of interest contains only bran and endosperm with germ being completely destroyed by the process.

As can be seen from the data, at the low moisture level of 11.8%, embryo cleavage began to be observed at around 29 m/s. At an impact speed of around 29 m/s, embryo cleavage was observed for all studied moisture levels except 18%. At around 38 m/s, useful embryo cleavage was observed in the lower moisture ranges. In the range of 48 to 72 m/s, useful embryo cleavage was observed across all nearly all moisture levels with the exception of 18% moisture. At around 86 m/s, the wheat berries began to pulverize against the impact surface across all studied moisture levels.

Figure 15:
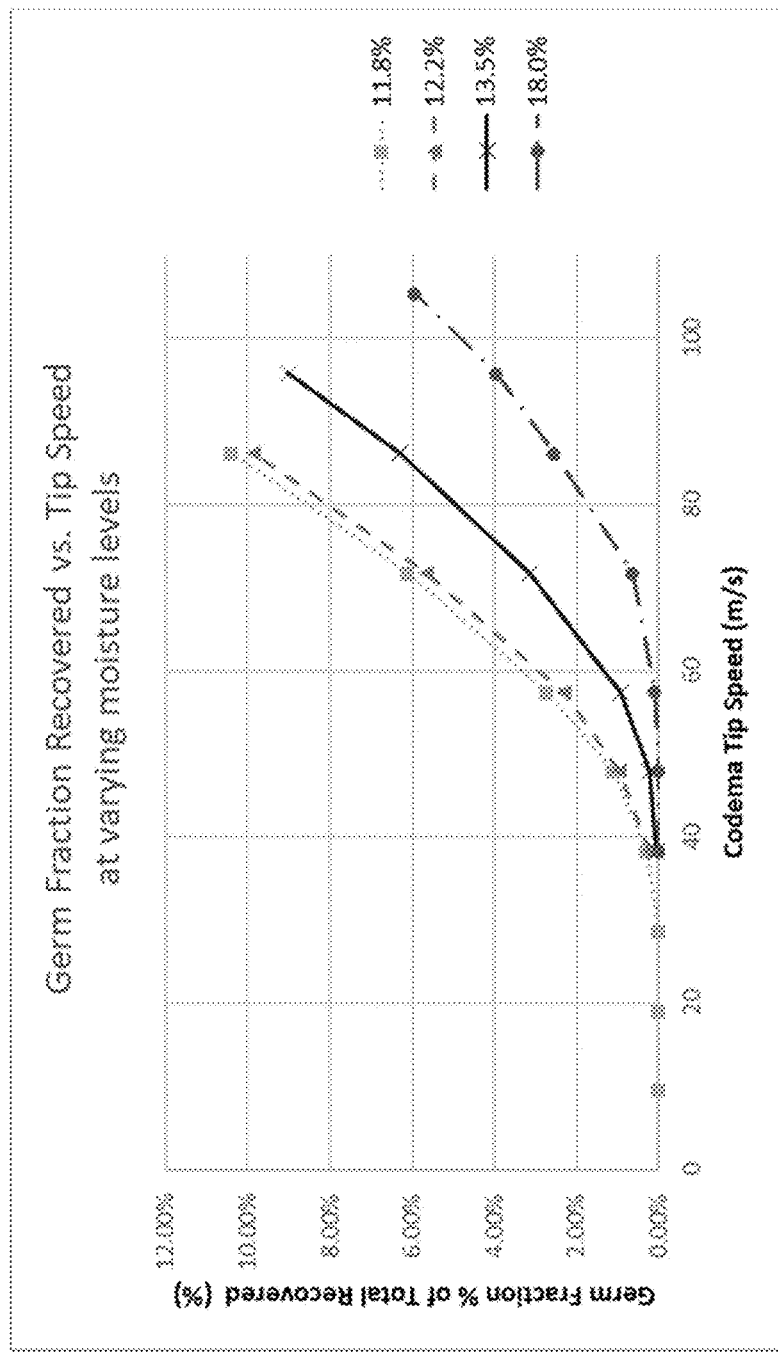

Turning to FIG. 15, the amount of material recovered in the fraction of interest is reported as a percentage of the total material milled. The graph of FIG. 15 shows that the amount of material released into the fraction of interest decreases with moisture content at all levels of impact velocity.

Figure 16:
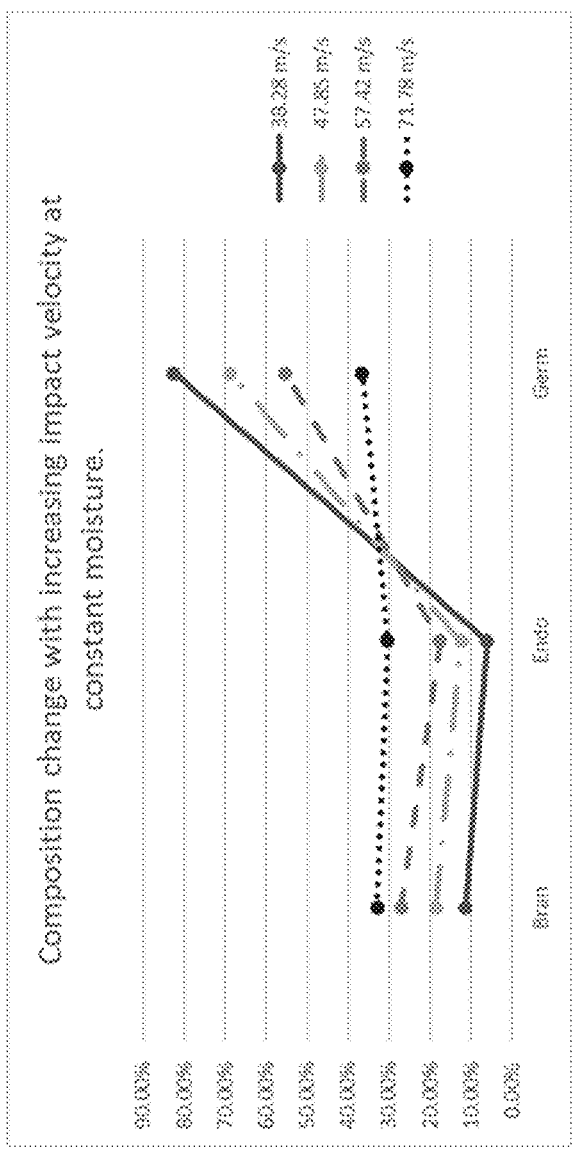

As shown in FIG. 16, at a constant moisture of 13.5% impact velocity between 38.28 and 57.42 produces a favorable mixture as germ (embryo) is the majority portion in the fraction of interest. Above 71.7 m/s, the additional germ yield comes at a penalty for downstream processing.

Figure 17:
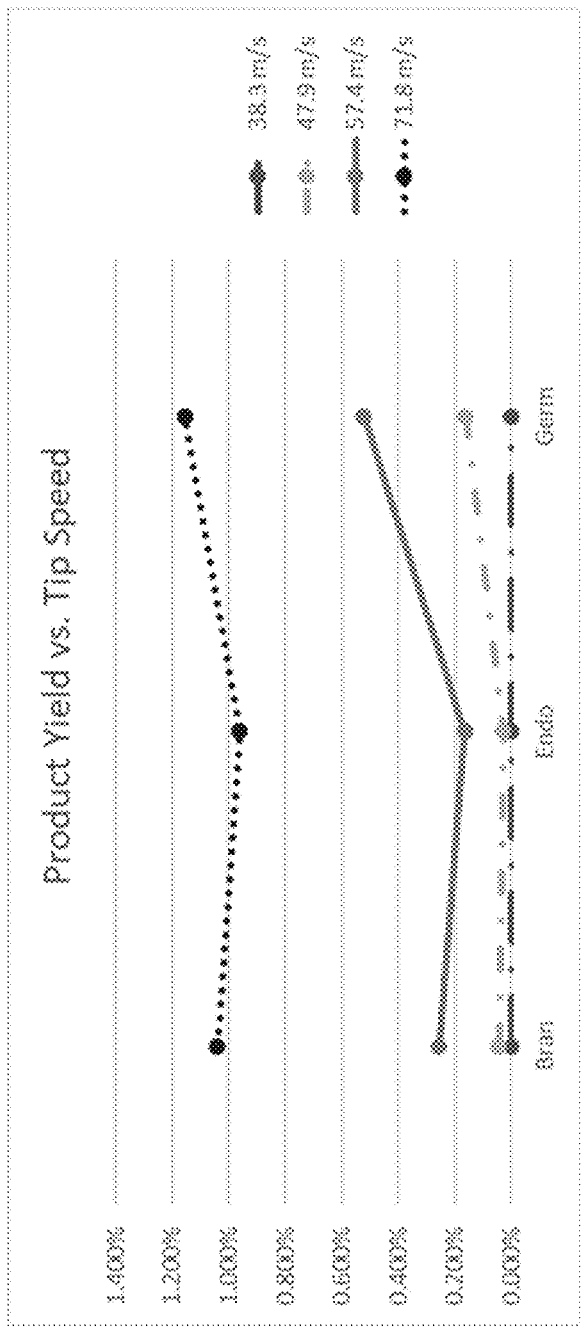

As shown in FIG. 17, along with composition, the total yield of viable germ is an important factor for optimal impact velocity. At impact velocity below 38.3 m/s, no meaningful amount of product is yielded from the process. Yield is increased at velocities up to 71.8 m/s then above this speed the conditions for down-stream processing are less favorable. For example, the viability of the embryos may be compromised.

Figure 18:
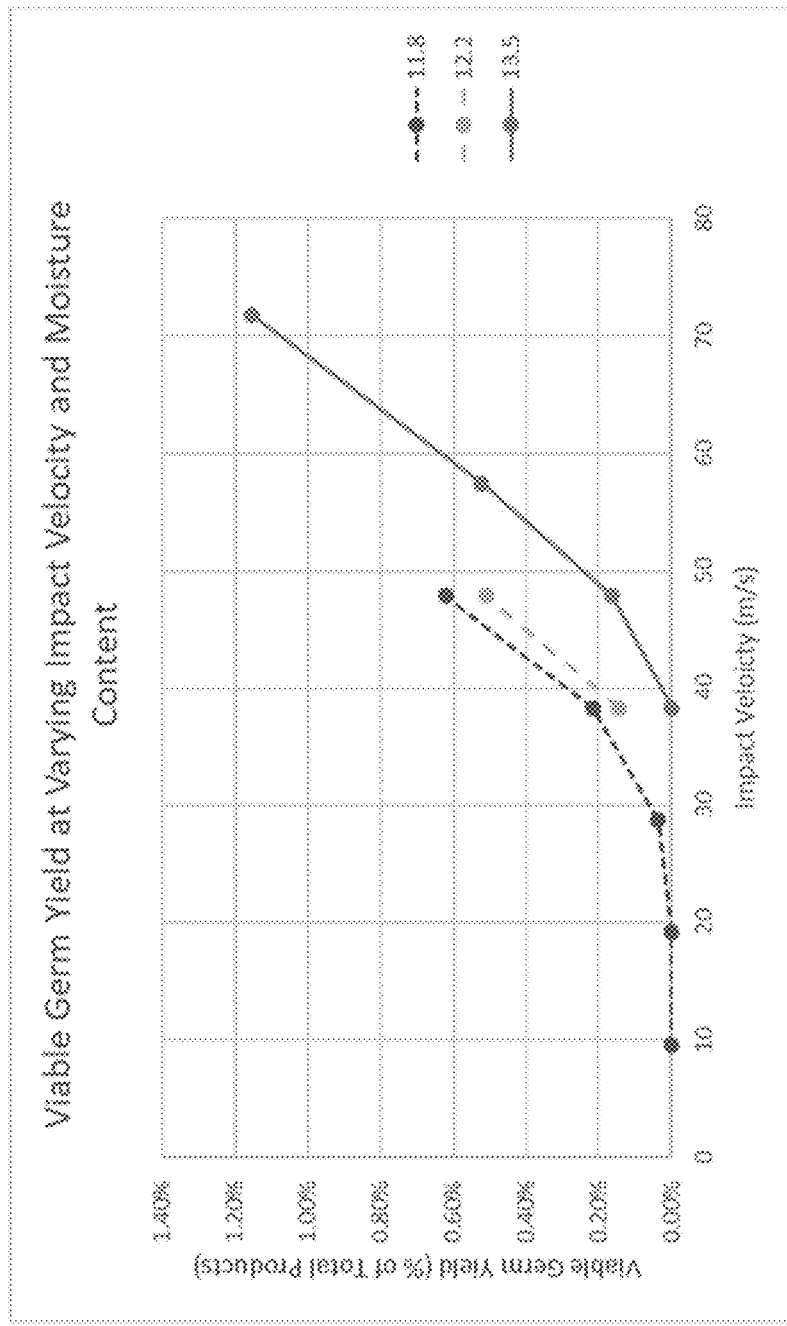
FIG. 18 is a graph showing the actual yield of viable germ at varying impact velocity and moisture levels.

FIG. 18 is a graph showing the actual yield of viable germ at varying impact velocity and moisture levels. This graph shows that the optimal speed and moisture are a matrix and the speed can be altered within a range to compensate and optimize viable germ yield for a range of conditions.

Example 2—Surface Abrasion

Mechanical surface abrasion prior to single-impact milling was investigated as a potential means for improving the cleavage of the wheat embryos from the wheat berries.

Figure 19:
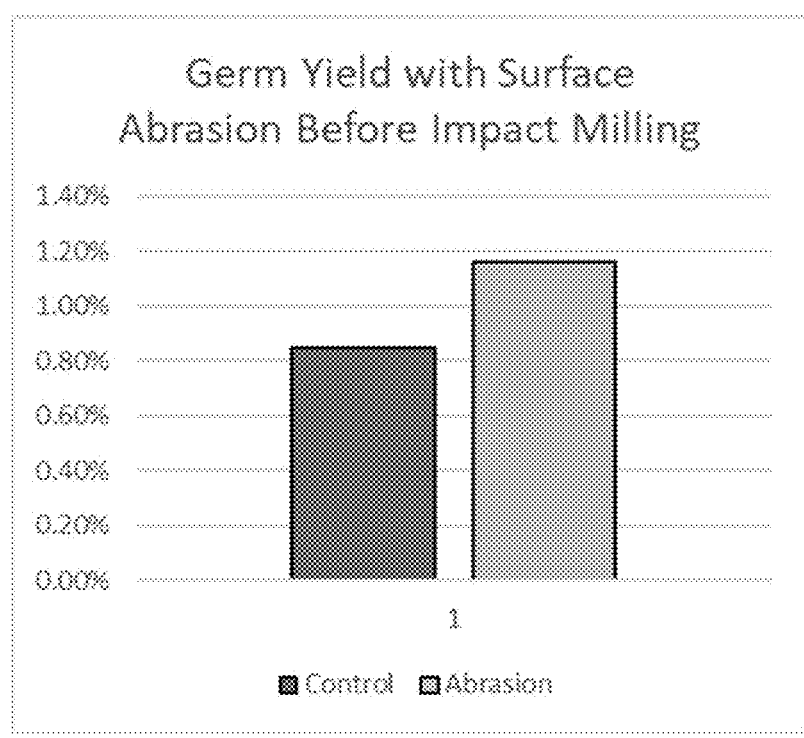
FIG. 19 shows the results of a pre-impact milling abrasion study.

FIG. 19 Mechanical surface abrasion is aided by increased moisture content, so this study was conducted at 14% moisture content. The sample was milled at a higher impact velocity of 57.4 m/s to compensate for the increased moisture content. As can be seen, the mechanical surface abrasion improved the yield of cleaved embryo.

Without wishing to be bound by theory, it is hypothesized that the surface abrasion removed and/or loosened at least some of the protective outer bran layer, leading to more effective subsequent single-impact milling.

Example 3—Quantitative Image Analysis

Quantitative Image analysis methods were developed to allow quantification of the results of the process, including the amount of damaged and likely non-viable embryos. Machine learning image analysis algorithms were recorded which quantified the type and condition of discrete particles based on the color and size of objects in the images.

Figure 20:
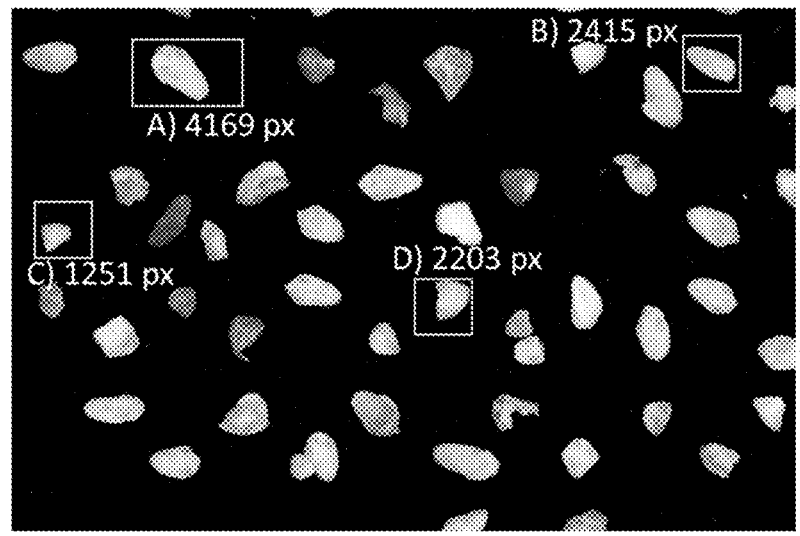
FIGS. 20 and 21 show images used in quantitative image analysis of an intermediate purified whet embryo product in accordance with the present disclosure.
Figure 21:
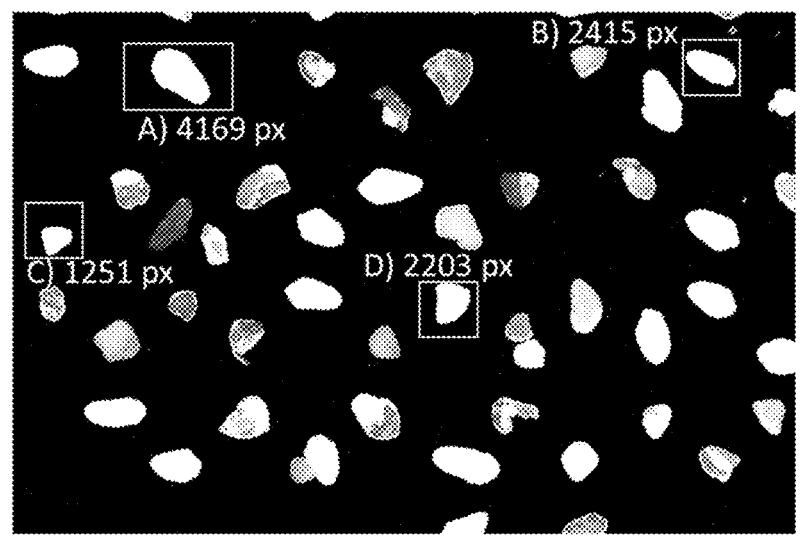
Figure 22:
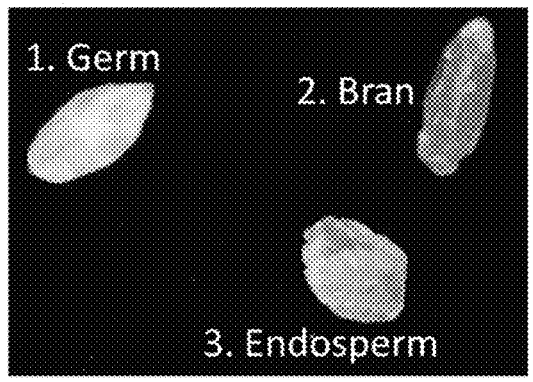
FIGS. 22-25 show quantitative image analysis with ilastic, using machine learning to classify pixels based on a training image.

Turning to FIGS. 20 and 21, one embodiment of the algorithm is shown. As shown in an image of particles produced from the methods disclosed above is obtained. Objects were identified as endosperm, bran or embryo. Then embryo particles were analyzed to determine whether they are broken. The general rule developed is that objects identified as germ with a size lower than 2200 pixels are derived from broken germ particles. Using this measure, the types of material and amount of damage sustained in the process can be quantified. Intact germ particles range from; Large Intact A) 4169 px. to Small Intact B) 2415 px. and broken fragments could range from Small Broken C) 1251 px to Large Broken D) 2203 px. This relative size comparison along with visual inspection gives meaning to the particle size distributions measured for composite samples from each processing technique.

FIGS. 22-25 shows quantitative image analysis with ilastic, using machine learning to classify pixels based on a training image. From the training, pixels are grouped into objects based on their composition, and detailed statistics are reported based on size and abundance.

Figure 23:
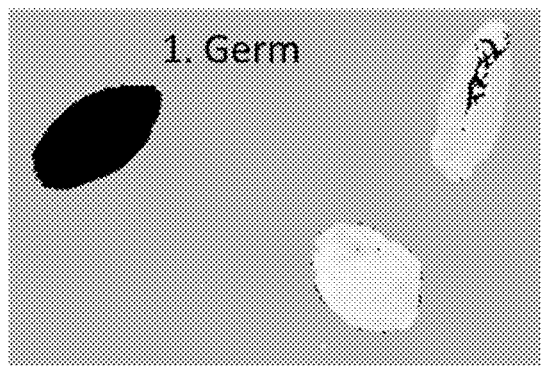
Figure 24:
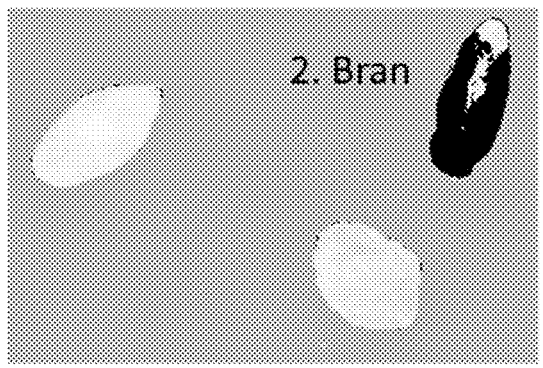
Figure 25:
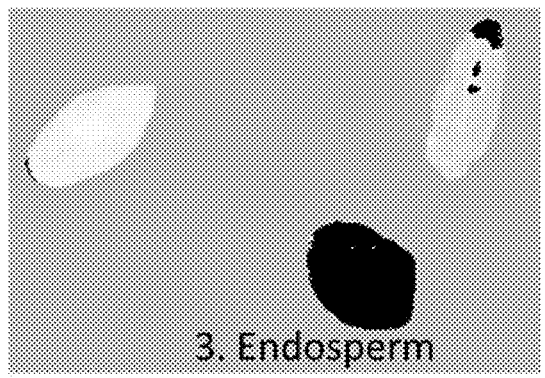

In this sample image taken from the analysis, the raw input (FIG. 22) contains an image of the three components. In further analysis, the three components are classified separately. In some cases the particles are some combination of the three materials. FIG. 23 shows the pixels classified as 1. Germ, from the three main components in FIG. 22. FIG. 24 shows the pixels classified as 2. Bran, from the three main components in FIG. 22. FIG. 25 shows the pixels classified as 3. Endosperm, from the three main components in FIG. 22.

Example 4—Comparative Data vs Posner Process

To obtain comparative data to the prior art product and process developed by Posner, access to the very same Forster horizontal laboratory scourer that Posner used at Kansas State University was secured. The process explained in "A Technique for Separation of Wheat Germ by Impacting and Subsequent Grinding", Journal of Cereal Science 13 (1991) 49-70, E. S. POSNER and Y. Z. LI and U.S. Pat. No. 4,986,997 was recreated. The products of the recreated Posner process were then analyzed via the image analysis techniques detailed above.

Figure 26:
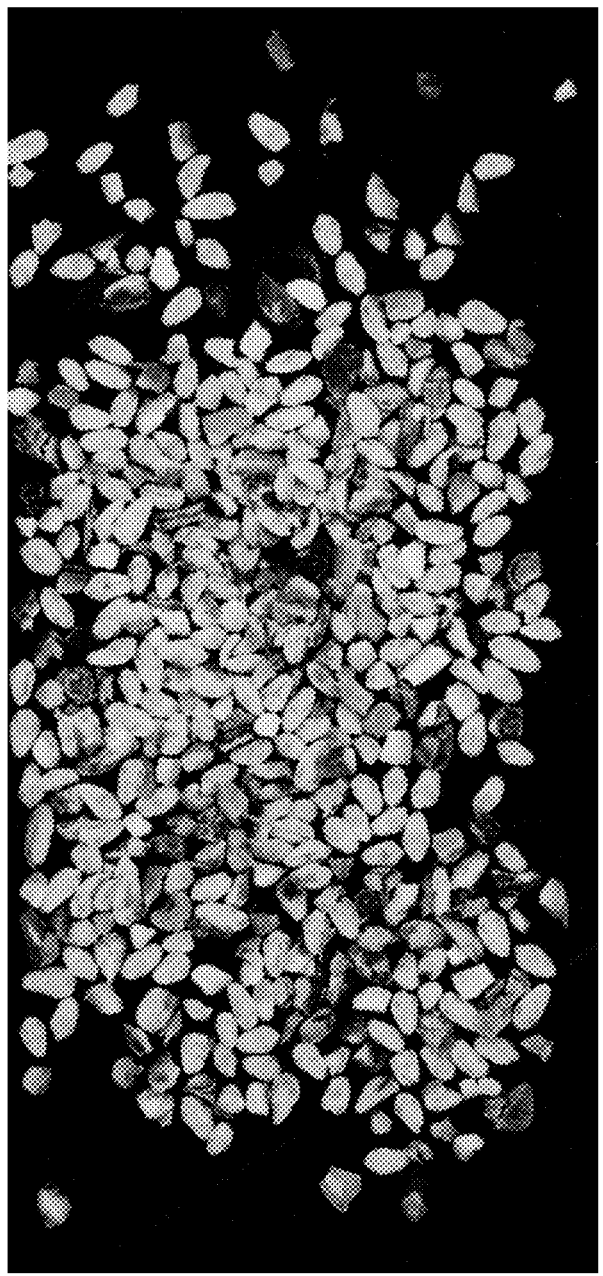
FIG. 26 shows a photograph of the product of the Posner prior art process.
Figure 27:
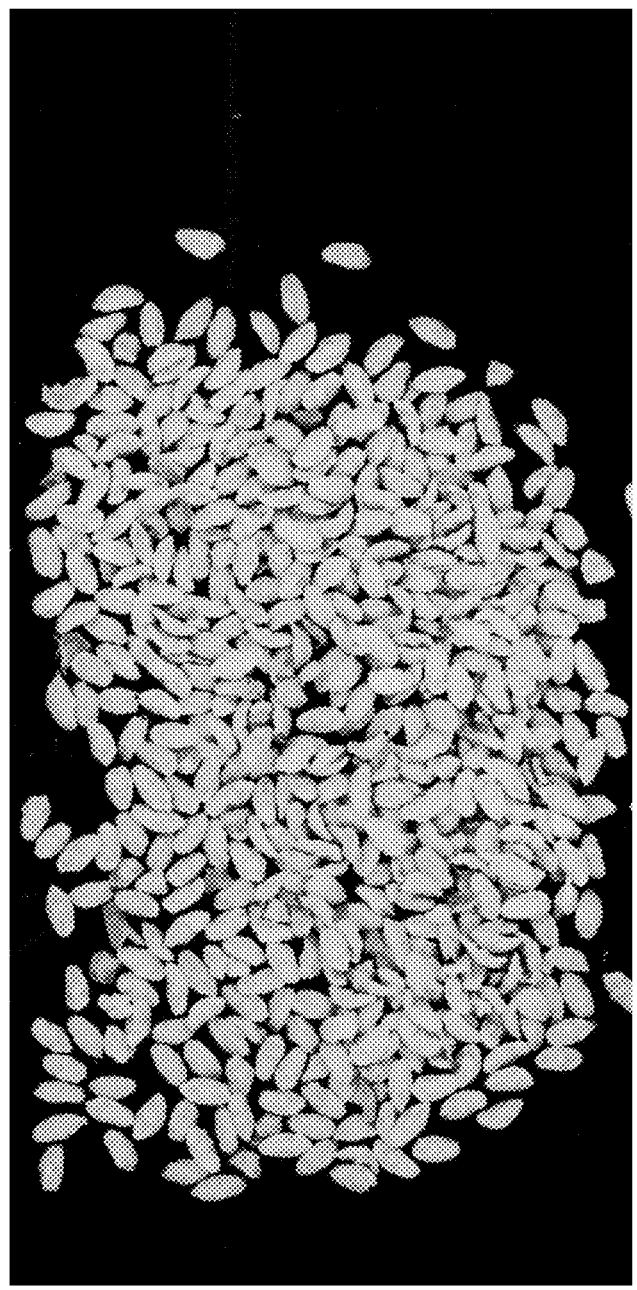
FIG. 27 shows a photograph of the product of impact milling and dry processing in accordance with the present disclosure.
Figure 28:
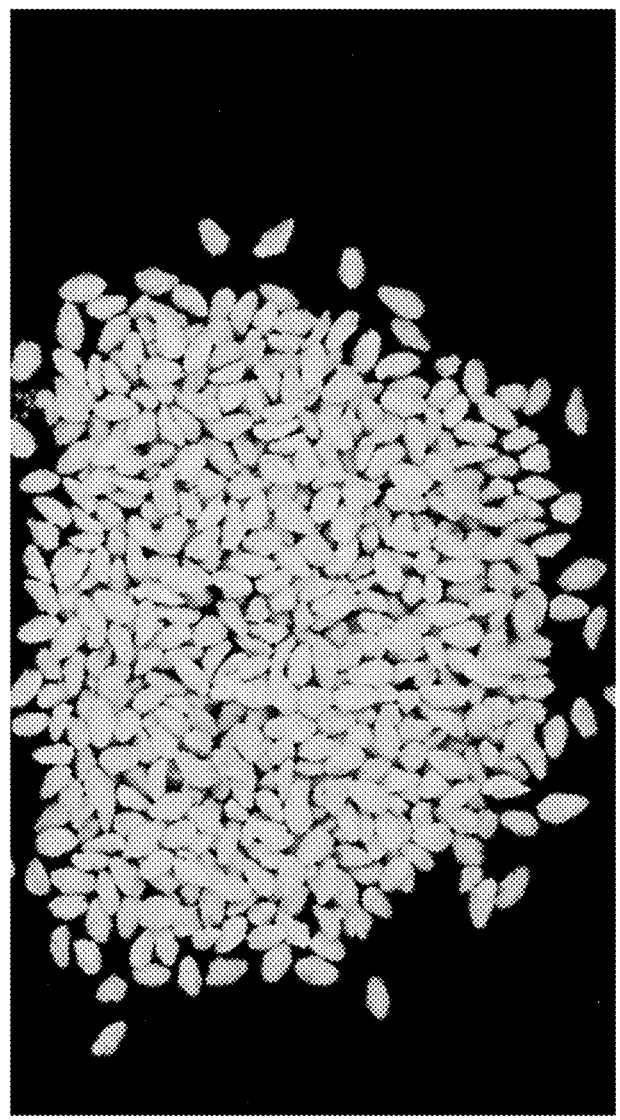
FIG. 28 shows a photograph of the product of impact and dry processing plus wet post processing in accordance with the present disclosure.

FIG. 26 shows a photograph of the product of the Posner process. FIG. 27 shows a photograph of the product of impact milling and dry processing in accordance with the present disclosure. Specifically, for this study the dry processing included single-impact milling, sifting, air separating, and color sorting. FIG. 28 shows a photograph of the product of impact and dry processing plus wet post processing. For this study, the wet post processing included single-impact milling, sifting, air separating, color sorting, and subsequent liquid density separation.

Image analysis: Three samples (one from each process technique) were imaged under identical conditions. For each sample~0.25 mg of material were used for the image. The images were color adjusted together under identical settings with no image cropping. The exact number of total pixels per image were used in each classification routine. The classified pixels were grouped by composition and nearest neighbor into objects. Each size of each object was calculated and relevant statistics about shape composition and position were collected.

TABLE 1

Purity obtained for Posner vs. Dry Process vs Wet Post Process

|  | % of Total | Pixels per Class | Sample Weight (g) |
|---|---|---|---|
| Posner Process (Prior art) |  |  |  |
| Embryo | 60.79% | 1,028,325 | 0.2616 |
| Endosperm | 16.30% | 275,780 |  |
| Bran | 22.91% | 387,544 |  |
| Total |  | 1,691,649 |  |
| Dry Process |  |  |  |
| Embryo | 91.37% | 1,538,243 | 0.2622 |
| Endosperm | 4.14% | 69,651 |  |
| Bran | 4.50% | 75,709 |  |
| Total |  | 1,683,603 |  |
| Wet post process |  |  |  |
| Embryo | 99.93% | 1,906,716 | 0.2604 |
| Endosperm | 0.02% | 453 |  |
| Bran | 0.04% | 803 |  |
| Total |  | 1,907,972 |  |

As can be seen from table 1, the Posner process achieved an embryo purity of 61%, as compared to an embryo purity of 91% for the dry process of the instant disclosure and an embryo purity of 99.93% for the wet post process of the instant disclosure.

Embryo Viability: FIG. 29 shows a test of embryo viability for a randomly selected group of embryos collected via the dry process of the instant disclosure (single-impact milling, sifting, air separating, and color sorting). The embryos were germinated on plant growth media for 48 hours. As can be seen, viability is clearly evident, as shown by root emergence and growth of nearly every embryo after the 48 hours of germination. FIG. 30 shows the results of the identical experiment for a group of embryos collected via the Posner process. As can be seen, viability appears entirely lacking, as not a single one of the Posner process embryos spouted after the same 48 hours of germination on the same growth media.

Figure 31:
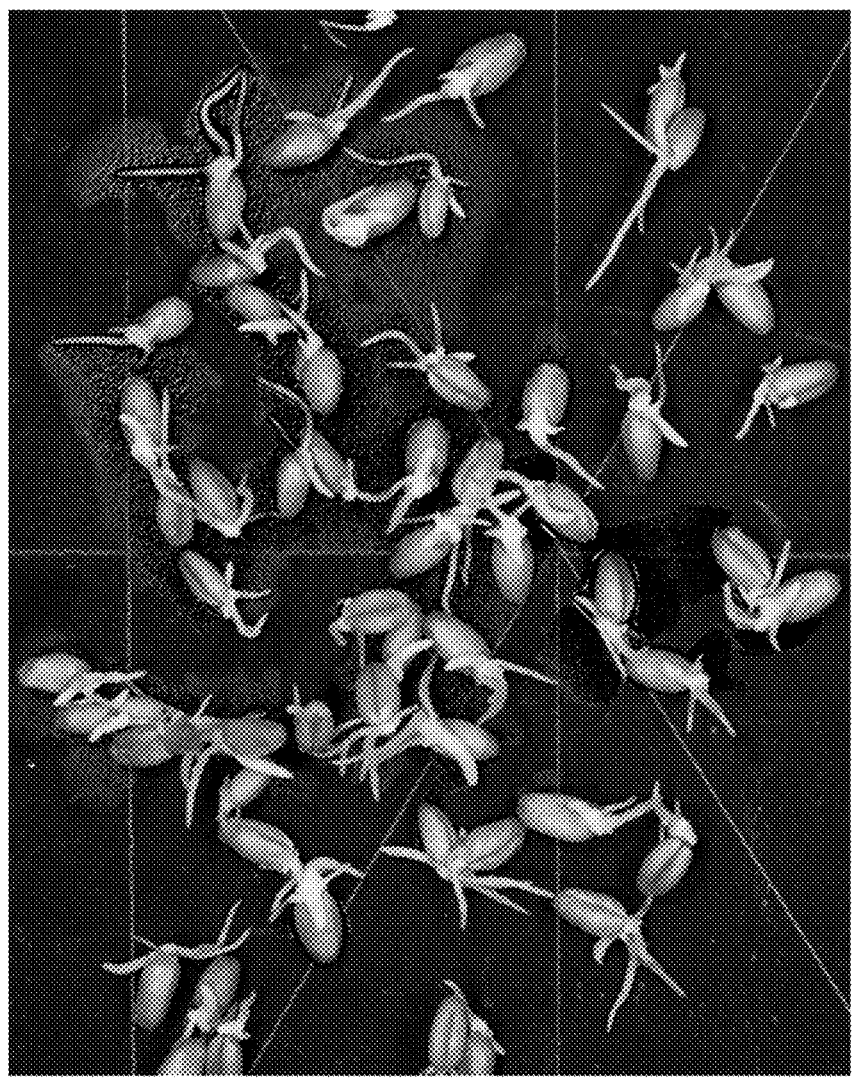
FIG. 31 shows a photograph of a control experiment testing the viability of the feedstock wheat berries used for the Posner process.

In order to eliminate other explanations for the failure of the Posner process embryos to germinate, a sample of the feedstock wheat berries used for the Posner process were germinated without being processed in the Posner apparatus. The results are shown in FIG. 31. As can be seen, after germination on plant growth media for 48 hours, 100% of the wheat berries sprouted root growth. Thus, it can be concluded that the Posner process was responsible for the loss of viability.

Figure 32:
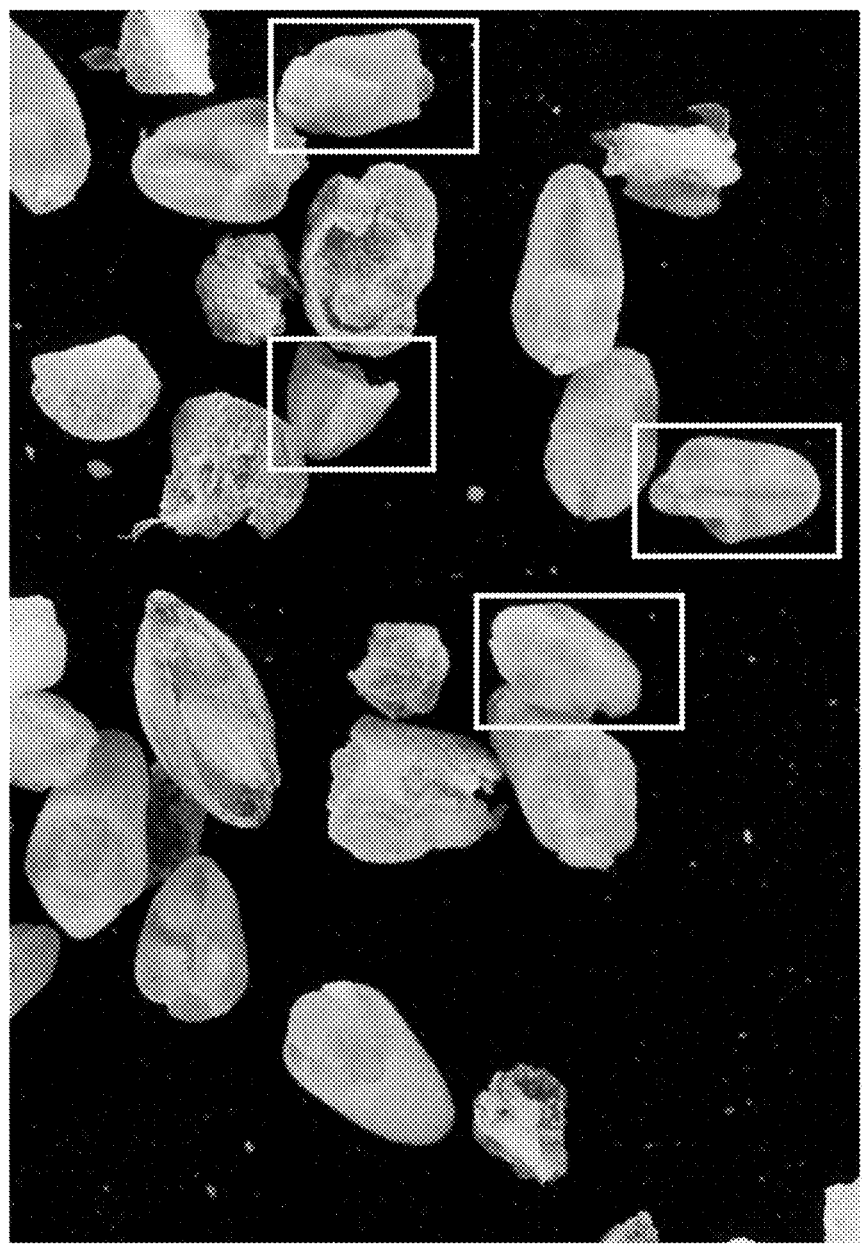
FIG. 32 shows a photograph of germ particle damage resulting from the Posner process.

Turning now to FIG. 32 an image showing the typical germ particle damage resulting from the repeated randomly oriented impacts of the sharp, rotating beaters of the Posner process. The white boxes highlight some of the damage sustained by the embryos, including complete breakage, chips, and fissuring, extinguishing viability and preventing germination. Based on the germination study, this damage appears lethal for most or all of the embryos obtained by the Posner process.

Figure 33:
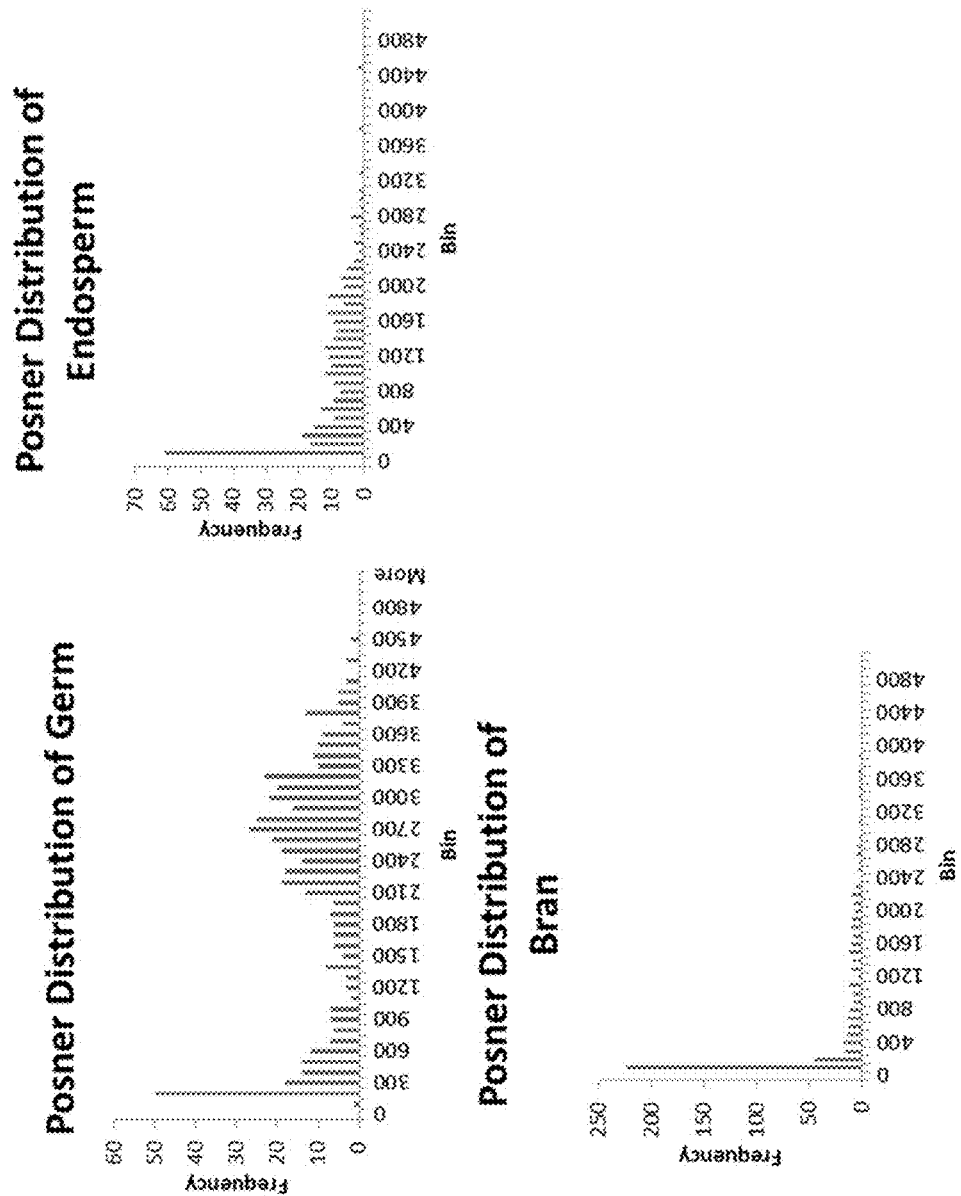
FIG. 33 shows the results of the image processing of the Posner sample.

FIG. 33 Shows the results of the image processing of the Posner sample. The distribution of germ particle size shows statistically what can be seen visually in FIG. 32, which is a large number of broken and chipped germ particles, plus a large amount of contamination from remaining bran and endosperm. The Posner method produced about 60% germ which is consistent with commercially produced wheat germ, and is also consistent with the proportion of fat and protein reported by Posner. Table 2 below shows the statistical analysis for the Posner distribution of Germ (embryo)

TABLE 2

Statistical analysis for the Posner distribution of Germ
Posner Germ

| Mean | 2060.7 |
| --- | --- |
| Standard Error | 53.3 |
| Median | 2375 |
| Mode | 109 |
| Standard Deviation | 1190.7 |
| Sample Variance | 1417950.8 |
| Kurtosis | −1.1097 |
| Skewness | −0.3578 |
| Range | 4372 |
| Minimum | 100 |
| Maximum | 4472 |
| Sum | 1028325 |
| Count | 499 |

Figure 34:
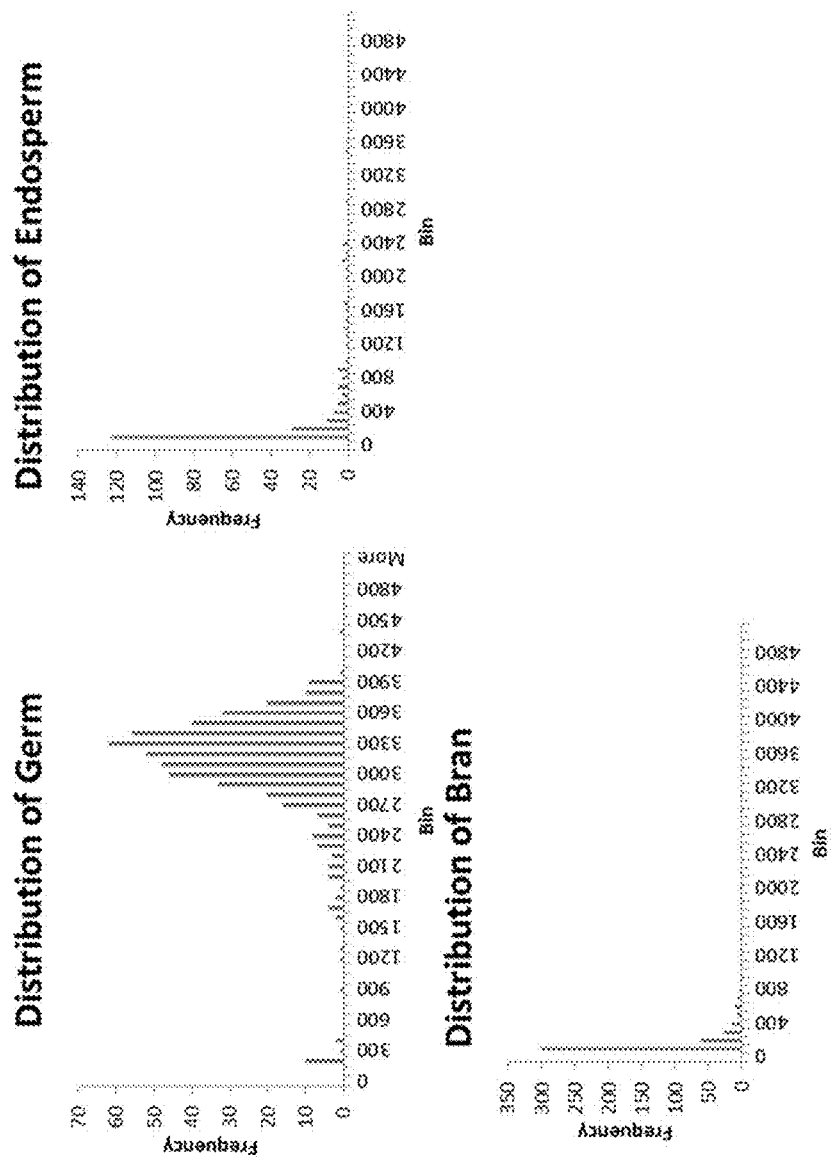
FIG. 34 shows the results of quantitative Image analysis of the dry process material.

FIG. 34 and Table 3 show the results of quantitative Image analysis of the dry process material, using the HRS cultivar Murdoch. Based on the understanding that the smallest intact germ particle is approximately 2000 pixels, as detailed above, the dry process method contains less than 5% broken germ particles. Compared to the Posner method which has approximately 36% broken sized germ particles. Based on the failure of any of the Posner embryos to germinate, it is postulated that even the unbroken Posner embryos sustain lethal damage during processing.

TABLE 3

Statistical analysis for the dry process germ
Dry Process Germ

| Mean | 3022.08 |
| --- | --- |
| Standard Error | 28.513 |
| Median | 3156 |
| Mode | 3244 |
| Standard Deviation | 643.32 |
| Sample Variance | 413873.12 |
| Kurtosis | 8.279 |
| Skewness | −2.526 |
| Range | 4227 |
| Minimum | 101 |
| Maximum | 4328 |
| Sum | 1538243 |
| Count | 509 |

Figure 35:
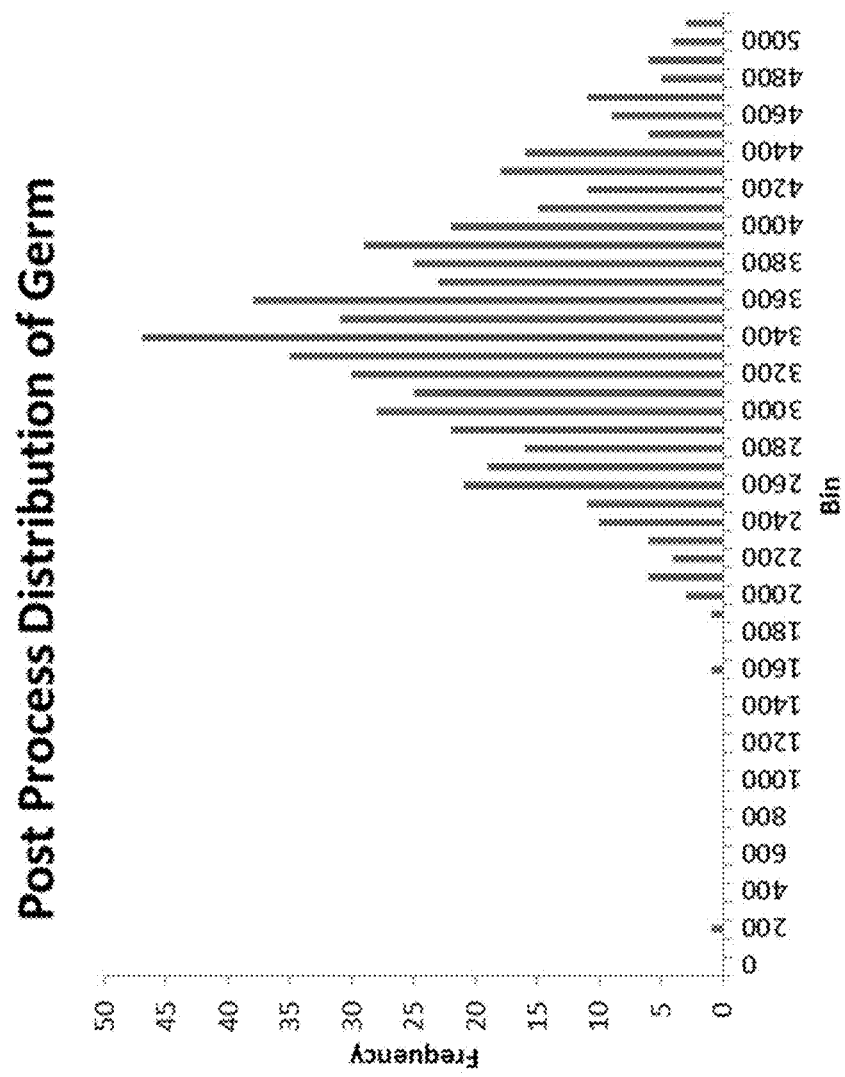
FIG. 35 shows the results of the image processing for the wet post process.

FIG. 35 and Table 4 show the results of the image processing for the wet post process, which resulted in 99.9% pure intact germ particles, with only 3 particles with a size smaller than 2,000 pixels.

TABLE 4

Statistical analysis for the wet post process germ
Wet Post Process Germ

| Mean | 3417.05 |
| --- | --- |
| Standard Error | 28.72 |
| Median | 3390.5 |
| Mode | 3361 |
| Standard Deviation | 679.015 |
| Sample Variance | 461061.437 |
| Kurtosis | 0.7218 |
| Skewness | −0.0096 |
| Range | 5818 |
| Minimum | 109 |
| Maximum | 5927 |
| Sum | 1906716 |
| Count | 558 |

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for producing a filtered wheat embryo product, the method comprising the steps of:
    obtaining a plurality of wheat berries, the wheat berries comprising wheat embryos, bran, and endosperm;
    accelerating each of the plurality of wheat berries toward an impact surface;
    impacting each of the plurality of wheat berries against the impact surface;
    in response to the impacting step, dislodging at least some of the wheat embryos from the wheat berries such that the dislodged wheat embryos are intact;
    separating the dislodged wheat embryos from the bran and the endosperm;
    pulverizing the dislodged wheat embryos to produce pulverized wheat embryos, wherein the pulverizing comprises blending the wheat embryos with an extraction liquid to produce a slurry; and
    filtering the pulverized wheat embryos to produce an intermediate filtered wheat embryo product.

2. The method of claim 1, wherein each of the wheat berries has a longitudinal axis extending between a first end and a second end, the wheat embryo being disposed at the first end, the method comprising:
    prior to the impacting step, orienting the wheat berries such that each wheat berry impacts the impact surface at the first end or the second end.

3. The method of claim 2, wherein each wheat berry impacts the impact surface with an impact direction, the impact direction being aligned with the longitudinal axis of the wheat berry.

4. The method of claim 1, wherein the impacting comprises impacting each of the plurality of wheat berries only a single time against the impact surface.

5. The method of claim 1, wherein the impact surface is a stationary surface during the impacting step.

6. The method of claim 1, wherein in response to the accelerating step and before the impacting step, each wheat berry becomes a projectile.

7. The method of claim 1, wherein the intermediate filtered wheat embryo product is substantially free of decomposition products.

8. The method of claim 1, wherein the separating step comprises screening the dislodged wheat embryos from the bran and the endosperm.

9. The method of claim 8, wherein the screening step comprises screening for particles between 1300 and 600 microns in order to isolate the wheat embryos from the bran and the endosperm.

10. The method of claim 8, wherein the screening step comprises screening for particles between 1180 and 680 microns in order to isolate the wheat embryos from the bran and the endosperm.

11. The method of claim 1, wherein the separating step comprises floatation of the wheat embryos in an aqueous liquid.

12. The method of claim 1, wherein the pulverizing comprises, prior to a blending step of the pulverizing, freezing the wheat embryos, and wherein the freezing step comprises contacting the wheat embryos with liquid nitrogen.

13. The method of claim 1, comprising a purification step comprising decanting the slurry.

14. The method of claim 13, wherein the decanting step comprises centrifuging the slurry and decanting a supernatant liquid.

15. The method of claim 14, wherein the filtering step comprises passing the supernatant liquid through a column filter.

16. The method of claim 15, wherein the column filter is a gel column filter.

17. The method of claim 1, wherein the impact surface is free of corners, blades, and/or sharp members.

18. The method of claim 1, wherein the impact surface is ceramic or steel.

19. The method of claim 1, wherein the separating step comprises optically color sorting the wheat embryos from the bran and the endosperm.

20. The method of claim 2, wherein the accelerating step is performed via an impeller.

21. The method of claim 20, wherein the impeller comprises a plurality of radially disposed vanes, the orienting step comprising accelerating the wheat berries along grooves formed in the vanes, a size and shape of the grooves corresponding to a cross section of each wheat berry perpendicular to a longitudinal axis of each wheat berry.

22. The method of claim 1, wherein the accelerating step is performed via a tube and a compressed gas source, and wherein the tube has a diameter, the diameter corresponding to a cross section of each wheat berry perpendicular to a longitudinal axis of each wheat berry.

23. A method for producing a filtered wheat embryo product, the method comprising the steps of:
   obtaining a plurality of wheat berries, the wheat berries comprising wheat embryos, bran, and endosperm;
   accelerating each of the plurality of wheat berries toward an impact surface;
   impacting each of the plurality of wheat berries against the impact surface;
   in response to the impacting step, dislodging at least some of the wheat embryos from the wheat berries such that the dislodged embryos are intact;
   separating the dislodged wheat embryos from the bran and the endosperm;
   pulverizing the dislodged wheat embryos to produce pulverized wheat embryos, wherein the pulverizing comprises, prior to a blending step of the pulverizing, freezing the wheat embryos; and
   filtering the pulverized wheat embryos to produce an intermediate filtered wheat embryo product.

24. A method for producing a filtered wheat embryo product, the method comprising the steps of:
   obtaining a plurality of wheat berries, the wheat berries comprising wheat embryos, bran, and endosperm;
   accelerating each of the plurality of wheat berries, via a tube and a compressed gas source, toward an impact surface;
   impacting each of the plurality of wheat berries against the impact surface;
   in response to the impacting step, dislodging at least some of the wheat embryos from the wheat berries such that the dislodged embryos are intact;
   separating the dislodged wheat embryos from the bran and the endosperm;
   pulverizing the dislodged wheat embryos to produce pulverized wheat embryos; and
   filtering the pulverized wheat embryos to produce an intermediate filtered wheat embryo product.

* * * * *